US010500498B2

(12) United States Patent
Lowery et al.

(10) Patent No.: US 10,500,498 B2
(45) Date of Patent: Dec. 10, 2019

(54) SYSTEM AND METHOD FOR OPTIMIZING VIRTUAL GAMES

(71) Applicant: Activision Publishing, Inc., Santa Monica, CA (US)

(72) Inventors: Parker E. Lowery, Tarzana, CA (US); Christian K. Widmer, Los Angeles, CA (US); Brian S. Feldstein, Playa Vista, CA (US); Stephen A. Lang, Lyons, CO (US)

(73) Assignee: Activision Publishing, Inc., Santa Monica, CA (US)

( * ) Notice: Subject to any disclaimer, the term of this patent is extended or adjusted under 35 U.S.C. 154(b) by 225 days.

(21) Appl. No.: 15/588,000

(22) Filed: May 5, 2017

(65) Prior Publication Data

US 2018/0147491 A1 May 31, 2018

Related U.S. Application Data

(60) Provisional application No. 62/427,674, filed on Nov. 29, 2016.

(51) Int. Cl.
*A63F 13/60* (2014.01)
*A63F 13/69* (2014.01)
(Continued)

(52) U.S. Cl.
CPC .............. *A63F 13/60* (2014.09); *A63F 13/67* (2014.09); *A63F 13/69* (2014.09); *A63F 13/537* (2014.09)

(58) Field of Classification Search
CPC .......... A63F 13/60; A63F 13/69; A63F 13/67; A63F 13/79; G07F 17/3244
See application file for complete search history.

(56) References Cited

U.S. PATENT DOCUMENTS 4,461,301 A 7/1984 Ochs
4,908,761 A 3/1990 Tai
(Continued)

FOREIGN PATENT DOCUMENTS

AU 768367 3/2004
AU 2005215048 10/2011
(Continued)

OTHER PUBLICATIONS

Notice of Allowance dated May 23, 2017 for U.S. Appl. No. 14/961,220.
(Continued)

*Primary Examiner* — Jasson H Yoo
(74) *Attorney, Agent, or Firm* — Novel IP

(57) ABSTRACT

The present specification describes an assistive tool that facilitates the design of video games to achieve a true randomized, non-biased and neutral gaming environment that is bounded so that extremes of disincentives and excess incentives are avoided. In one embodiment, the tool allows for simulation of game environment and generates variables that enable reward acquisition by players. In one embodiment, the tool allows the game systems to be defined in such a way that an agent, such as an artificial player implemented by a computer program, can interact with the game environment. In one embodiment, the present tool uses generative models driven by data from previous versions of a game to define the behavior of such agents in simulated games.

14 Claims, 12 Drawing Sheets

(51) Int. Cl.
*A63F 13/67* (2014.01)
*A63F 13/537* (2014.01)

(56) References Cited

U.S. PATENT DOCUMENTS 5,031,089 A 7/1991 Liu
5,058,180 A 10/1991 Khan
5,365,360 A 11/1994 Torres
5,371,673 A 12/1994 Fan
5,432,934 A 7/1995 Levin
5,442,569 A 8/1995 Osano
5,493,692 A 2/1996 Theimer
5,497,186 A 3/1996 Kawasaki
5,530,796 A 6/1996 Wang
5,539,883 A 7/1996 Allon
5,561,736 A 10/1996 Moore
5,563,946 A 10/1996 Cooper
5,606,702 A 2/1997 Diel
5,630,129 A 5/1997 Wheat
5,685,775 A 11/1997 Bakoglu
5,694,616 A 12/1997 Johnson
5,706,507 A 1/1998 Schloss
5,708,764 A 1/1998 Borrel
5,726,883 A 3/1998 Levine
5,736,985 A 4/1998 Lection
5,736,990 A 4/1998 Barrus
5,737,416 A 4/1998 Cooper
5,745,113 A 4/1998 Jordan
5,745,678 A 4/1998 Herzberg
5,758,079 A 5/1998 Ludwig
5,761,083 A 6/1998 Brown
5,762,552 A 6/1998 Vuong
5,768,511 A 6/1998 Galvin
5,774,668 A 6/1998 Choquier
5,793,365 A 8/1998 Tang
5,825,877 A 10/1998 Dan
5,828,839 A 10/1998 Moncreiff
5,835,692 A 11/1998 Cragun
5,860,137 A 1/1999 Raz
5,877,763 A 3/1999 Berry
5,878,233 A 3/1999 Schloss
5,880,731 A 3/1999 Liles
5,883,628 A 3/1999 Mullaly
5,900,879 A 5/1999 Berry
5,903,266 A 5/1999 Berstis
5,903,271 A 5/1999 Bardon
5,911,045 A 6/1999 Leyba
5,920,325 A 7/1999 Morgan
5,920,692 A 7/1999 Nguyen
5,920,848 A 7/1999 Schutzer
5,923,324 A 7/1999 Berry
5,926,100 A 7/1999 Escolar
5,933,818 A 8/1999 Kasravi
5,938,722 A 8/1999 Johnson
5,958,014 A 9/1999 Cave
5,969,724 A 10/1999 Berry
5,977,979 A 11/1999 Clough
5,983,003 A 11/1999 Lection
5,990,887 A 11/1999 Redpath
5,990,888 A 11/1999 Blades
6,006,223 A 12/1999 Agrawal
6,008,848 A 12/1999 Tiwari
6,009,455 A 12/1999 Doyle
6,012,096 A 1/2000 Link
6,014,145 A 1/2000 Bardon
6,018,734 A 1/2000 Zhang
6,021,268 A 2/2000 Johnson
6,021,496 A 2/2000 Dutcher
6,025,839 A 2/2000 Schell
6,032,129 A 2/2000 Greef
6,049,819 A 4/2000 Buckle
6,058,266 A 5/2000 Megiddo
6,059,842 A 5/2000 Dumarot
6,067,355 A 5/2000 Lim
6,069,632 A 5/2000 Mullaly
6,070,143 A 5/2000 Barney
6,076,093 A 6/2000 Pickering
6,081,270 A 6/2000 Berry
6,081,271 A 6/2000 Bardon
6,088,727 A 7/2000 Hosokawa
6,088,732 A 7/2000 Smith
6,091,410 A 7/2000 Lection
6,094,196 A 7/2000 Berry
6,098,056 A 8/2000 Rusnak
6,101,538 A 8/2000 Brown
6,104,406 A 8/2000 Berry
6,111,581 A 8/2000 Berry
6,115,718 A 9/2000 Huberman
6,134,588 A 10/2000 Guenthner
6,138,128 A 10/2000 Perkowitz
6,141,699 A 10/2000 Luzzi
6,144,381 A 11/2000 Lection
6,148,294 A 11/2000 Beyda
6,148,328 A 11/2000 Cuomo
6,157,953 A 12/2000 Chang
6,177,932 B1 1/2001 Galdes
6,179,713 B1 1/2001 James
6,182,067 B1 1/2001 Presnell
6,185,614 B1 2/2001 Cuomo
6,195,657 B1 2/2001 Rucker
6,199,067 B1 3/2001 Geller
6,201,881 B1 3/2001 Masuda
6,212,494 B1 4/2001 Boguraev
6,212,548 B1 4/2001 Desimone
6,216,098 B1 4/2001 Clancey
6,222,551 B1 4/2001 Schneider
6,226,686 B1 5/2001 Rothschild
6,233,583 B1 5/2001 Hoth
6,249,779 B1 6/2001 Hitt
6,266,649 B1 7/2001 Linden
6,271,842 B1 8/2001 Bardon
6,271,843 B1 8/2001 Lection
6,275,820 B1 8/2001 Navin-Chandra
6,282,547 B1 8/2001 Hirsch
6,293,865 B1 9/2001 Kelly
6,301,609 B1 10/2001 Aravamudan et al.
6,308,208 B1 10/2001 Jung
6,311,206 B1 10/2001 Malkin
6,314,465 B1 11/2001 Paul
6,330,281 B1 12/2001 Mann
6,334,127 B1 12/2001 Bieganski
6,334,141 B1 12/2001 Varma
6,336,134 B1 1/2002 Varma
6,337,700 B1 1/2002 Kinoe
6,345,264 B1 2/2002 Breese
6,345,287 B1 2/2002 Fong
6,349,091 B1 2/2002 Li
6,351,775 B1 2/2002 Yu
6,353,449 B1 3/2002 Gregg
6,356,297 B1 3/2002 Cheng
6,360,254 B1 3/2002 Linden
6,363,174 B1 3/2002 Lu
6,370,560 B1 4/2002 Robertazzi
6,396,513 B1 5/2002 Helfman
6,411,312 B1 6/2002 Sheppard
6,418,424 B1 7/2002 Hoffberg
6,418,462 B1 7/2002 Xu
6,426,757 B1 7/2002 Smith
6,445,389 B1 9/2002 Bossen
6,452,593 B1 9/2002 Challener
6,462,760 B1 10/2002 Cox, Jr.
6,463,078 B1 10/2002 Engstrom
6,466,550 B1 10/2002 Foster
6,469,712 B1 10/2002 Hilpert, Jr.
6,473,085 B1 10/2002 Brock
6,473,103 B1 10/2002 Bailey
6,473,597 B1 10/2002 Johnson
6,476,830 B1 11/2002 Farmer
6,499,053 B1 12/2002 Marquette
6,501,834 B1 12/2002 Milewski
6,505,208 B1 1/2003 Kanevsky
6,509,925 B1 1/2003 Dermler
6,525,731 B1 2/2003 Suits
6,539,415 B1 3/2003 Mercs

(56) References Cited

U.S. PATENT DOCUMENTS 6,549,933 B1 4/2003 Barrett
6,559,863 B1 5/2003 Megiddo
6,567,109 B1 5/2003 Todd
6,567,813 B1 5/2003 Zhu
6,574,477 B1 6/2003 Rathunde
6,580,981 B1 6/2003 Masood
6,594,673 B1 7/2003 Smith
6,601,084 B1 7/2003 Bhaskaran
6,618,751 B1 9/2003 Challenger
6,640,230 B1 10/2003 Alexander
6,641,481 B1 11/2003 Mai
6,645,153 B2 11/2003 Kroll
RE38,375 E 12/2003 Herzberg
6,657,617 B2 12/2003 Paolini
6,657,642 B1 12/2003 Bardon
6,684,255 B1 1/2004 Martin
6,717,600 B2 4/2004 Dutta
6,734,884 B1 5/2004 Berry
6,742,032 B1 5/2004 Castellani
6,763,273 B2 7/2004 Chudley
6,765,596 B2 7/2004 Lection
6,781,607 B1 8/2004 Benham
6,801,930 B1 10/2004 Dionne
6,807,562 B1 10/2004 Pennock
6,819,669 B2 11/2004 Rooney
6,832,239 B1 12/2004 Kraft
6,836,480 B2 12/2004 Basso
6,845,389 B1 1/2005 Sen
6,854,007 B1 2/2005 Hammond
6,886,026 B1 4/2005 Hanson
6,901,379 B1 5/2005 Balter
6,941,236 B2 9/2005 Huelsbergen
6,948,168 B1 9/2005 Kuprionas
RE38,865 E 11/2005 Dumarot
6,970,929 B2 11/2005 Bae
6,993,596 B2 1/2006 Hinton
7,006,616 B1 2/2006 Christofferson
7,028,296 B2 4/2006 Irfan
7,031,473 B2 4/2006 Morais
7,050,868 B1 5/2006 Graepel
7,062,533 B2 6/2006 Brown
7,089,266 B2 8/2006 Stolte
7,124,071 B2 10/2006 Rich
7,124,164 B1 10/2006 Chemtob
7,139,792 B1 11/2006 Mishra
7,143,409 B2 11/2006 Herrero
7,159,217 B2 1/2007 Pulsipher
7,185,067 B1 2/2007 Viswanath
7,192,352 B2 3/2007 Walker
7,209,137 B2 4/2007 Brokenshire
7,230,616 B2 6/2007 Taubin
7,240,093 B1 7/2007 Danieli
7,249,123 B2 7/2007 Elder
7,263,511 B2 8/2007 Bodin
7,278,108 B2 10/2007 Duarte
7,287,053 B2 10/2007 Bodin
7,292,870 B2 11/2007 Heredia
7,305,438 B2 12/2007 Christensen
7,308,476 B2 12/2007 Mannaru
7,314,411 B2 1/2008 Lannert
7,328,242 B1 2/2008 McCarthy
7,353,295 B1 4/2008 Crow
7,376,474 B2 5/2008 Graepel
7,383,307 B2 6/2008 Kirkland
7,404,149 B2 7/2008 Fox
7,426,538 B2 9/2008 Bodin
7,427,980 B1 9/2008 Partridge
7,428,588 B2 9/2008 Berstis
7,429,987 B2 9/2008 Leah
7,436,407 B2 10/2008 Doi
7,439,975 B2 10/2008 Hsu
7,443,393 B2 10/2008 Shen
7,447,996 B1 11/2008 Cox
7,467,180 B2 12/2008 Kaufman
7,467,181 B2 12/2008 McGowan
7,475,354 B2 1/2009 Guido
7,478,127 B2 1/2009 Creamer
7,484,012 B2 1/2009 Hinton
7,503,007 B2 3/2009 Goodman
7,506,264 B2 3/2009 Polan
7,509,388 B2 3/2009 Allen
7,515,136 B1 4/2009 Kanevsky
7,525,964 B2 4/2009 Astley
7,527,191 B2 5/2009 Takayama
7,552,177 B2 6/2009 Kessen
7,565,650 B2 7/2009 Bhogal
7,571,224 B2 8/2009 Childress
7,571,389 B2 8/2009 Broussard
7,580,888 B2 8/2009 Ur
7,590,984 B2 9/2009 Kaufman
7,596,596 B2 9/2009 Chen
7,617,283 B2 11/2009 Aaron
7,640,587 B2 12/2009 Fox
7,667,701 B2 2/2010 Leah
7,698,656 B2 4/2010 Srivastava
7,702,730 B2 4/2010 Spataro
7,702,784 B2 4/2010 Berstis
7,714,867 B2 5/2010 Doi
7,719,532 B2 5/2010 Schardt
7,719,535 B2 5/2010 Tadokoro
7,734,691 B2 6/2010 Creamer
7,737,969 B2 6/2010 Shen
7,743,095 B2 6/2010 Goldberg
7,747,679 B2 6/2010 Galvin
7,765,478 B2 7/2010 Reed
7,768,514 B2 8/2010 Pagan
7,770,114 B2 8/2010 Sriprakash
7,773,087 B2 8/2010 Fowler
7,774,407 B2 8/2010 Daly
7,780,525 B2 8/2010 Walker
7,782,318 B2 8/2010 Shearer
7,792,263 B2 9/2010 D Amora
7,792,801 B2 9/2010 Hamilton, II
7,796,128 B2 9/2010 Radzikowski
7,808,500 B2 10/2010 Shearer
7,814,152 B2 10/2010 McGowan
7,827,318 B2 11/2010 Hinton
7,843,471 B2 11/2010 Doan
7,844,663 B2 11/2010 Boutboul
7,844,673 B2 11/2010 Bostick
7,847,799 B2 12/2010 Taubin
7,853,594 B2 12/2010 Elder
7,856,469 B2 12/2010 Chen
7,865,393 B2 1/2011 Leason
7,873,485 B2 1/2011 Castelli
7,882,222 B2 2/2011 Dolbier
7,882,243 B2 2/2011 Ivory
7,884,819 B2 2/2011 Kuesel
7,886,045 B2 2/2011 Bates
7,890,623 B2 2/2011 Bates
7,893,936 B2 2/2011 Shearer
7,904,829 B2 3/2011 Fox
7,921,128 B2 4/2011 Hamilton, II
7,940,265 B2 5/2011 Brown
7,945,620 B2 5/2011 Bou-Ghannam
7,945,802 B2 5/2011 Hamilton, II
7,955,171 B2 6/2011 Jorasch
7,970,837 B2 6/2011 Lyle
7,970,840 B2 6/2011 Cannon
7,985,132 B2 7/2011 Walker
7,985,138 B2 7/2011 Acharya
7,990,387 B2 8/2011 Hamilton, II
7,996,164 B2 8/2011 Hamilton, II
8,001,161 B2 8/2011 Finn
8,004,518 B2 8/2011 Fowler
8,005,025 B2 8/2011 Bodin
8,006,182 B2 8/2011 Bates
8,013,861 B2 9/2011 Hamilton, II
8,018,453 B2 9/2011 Fowler
8,018,462 B2 9/2011 Bhogal
8,019,797 B2 9/2011 Hamilton, II
8,019,858 B2 9/2011 Bauchot
8,022,948 B2 9/2011 Garbow
8,022,950 B2 9/2011 Brown

(56) References Cited

U.S. PATENT DOCUMENTS 8,026,913 B2 9/2011 Garbow
8,028,021 B2 9/2011 Reisinger
8,028,022 B2 9/2011 Brownholtz
8,037,416 B2 10/2011 Bates
8,041,614 B2 10/2011 Bhogal
8,046,700 B2 10/2011 Bates
8,051,462 B2 11/2011 Hamilton, II
8,055,656 B2 11/2011 Cradick
8,056,121 B2 11/2011 Hamilton, II
8,057,307 B2 11/2011 Berstis
8,062,130 B2 11/2011 Smith
8,063,905 B2 11/2011 Brown
8,070,601 B2 12/2011 Acharya
8,082,245 B2 12/2011 Bates
8,085,267 B2 12/2011 Brown
8,089,481 B2 1/2012 Shearer
8,092,288 B2 1/2012 Theis
8,095,881 B2 1/2012 Reisinger
8,099,338 B2 1/2012 Betzler
8,099,668 B2 1/2012 Garbow
8,102,334 B2 1/2012 Brown
8,103,640 B2 1/2012 Lo
8,103,959 B2 1/2012 Cannon
8,105,165 B2 1/2012 Karstens
8,108,774 B2 1/2012 Finn
8,113,959 B2 2/2012 De Judicibus
8,117,551 B2 2/2012 Cheng
8,125,485 B2 2/2012 Brown
8,127,235 B2 2/2012 Haggar
8,127,236 B2 2/2012 Hamilton, II
8,128,487 B2 3/2012 Hamilton, II
8,131,740 B2 3/2012 Cradick
8,132,235 B2 3/2012 Bussani
8,134,560 B2 3/2012 Bates
8,139,060 B2 3/2012 Brown
8,139,780 B2 3/2012 Shearer
8,140,340 B2 3/2012 Bhogal
8,140,620 B2 3/2012 Creamer
8,140,978 B2 3/2012 Betzler
8,140,982 B2 3/2012 Hamilton, II
8,145,676 B2 3/2012 Bhogal
8,145,725 B2 3/2012 Dawson
8,149,241 B2 4/2012 Do
8,151,191 B2 4/2012 Nicol, II
8,156,184 B2 4/2012 Kurata
8,165,350 B2 4/2012 Fuhrmann
8,171,407 B2 5/2012 Huang
8,171,408 B2 5/2012 Dawson
8,171,559 B2 5/2012 Hamilton, II
8,174,541 B2 5/2012 Greene
8,176,421 B2 5/2012 Dawson
8,176,422 B2 5/2012 Bergman
8,184,092 B2 5/2012 Cox
8,184,116 B2 5/2012 Finn
8,185,450 B2 5/2012 McVey
8,185,829 B2 5/2012 Cannon
8,187,067 B2 5/2012 Hamilton, II
8,199,145 B2 6/2012 Hamilton, II
8,203,561 B2 6/2012 Carter
8,214,335 B2 7/2012 Hamilton, II
8,214,433 B2 7/2012 Dawson
8,214,750 B2 7/2012 Hamilton, II
8,214,751 B2 7/2012 Dawson
8,217,953 B2 7/2012 Comparan
8,219,616 B2 7/2012 Dawson
8,230,045 B2 7/2012 Kawachiya
8,230,338 B2 7/2012 Dugan
8,233,005 B2 7/2012 Finn
8,234,234 B2 7/2012 Shearer
8,234,579 B2 7/2012 Do
8,239,775 B2 8/2012 Beverland
8,241,131 B2 8/2012 Bhogal
8,245,241 B2 8/2012 Hamilton, II
8,245,283 B2 8/2012 Dawson
8,265,253 B2 9/2012 D Amora
8,310,497 B2 11/2012 Comparan
8,334,871 B2 12/2012 Hamilton, II
8,360,886 B2 1/2013 Karstens
8,364,804 B2 1/2013 Childress
8,425,326 B2 4/2013 Chudley
8,442,946 B2 5/2013 Hamilton, II
8,506,372 B2 8/2013 Chudley
8,514,249 B2 8/2013 Hamilton, II
8,554,841 B2 10/2013 Kurata
8,607,142 B2 12/2013 Bergman
8,607,356 B2 12/2013 Hamilton, II
8,624,903 B2 1/2014 Hamilton, II
8,626,836 B2 1/2014 Dawson
8,692,835 B2 4/2014 Hamilton, II
8,721,412 B2 5/2014 Chudley
8,790,185 B1 * 7/2014 Caldarone .............. A63F 13/10
463/39
8,827,816 B2 9/2014 Bhogal
8,838,640 B2 9/2014 Bates
8,849,917 B2 9/2014 Dawson
8,911,296 B2 12/2014 Chudley
8,992,316 B2 3/2015 Smith
9,083,654 B2 7/2015 Dawson
9,152,914 B2 10/2015 Haggar
9,205,328 B2 12/2015 Bansi
9,286,731 B2 3/2016 Hamilton, II
9,299,080 B2 3/2016 Dawson
9,364,746 B2 6/2016 Chudley
9,525,746 B2 12/2016 Bates
9,583,109 B2 2/2017 Kurata
9,682,324 B2 6/2017 Bansi
9,764,244 B2 9/2017 Bansi
9,789,406 B2 10/2017 Marr
9,808,722 B2 11/2017 Kawachiya
2001/0032240 A1 10/2001 Malone
2002/0002514 A1 1/2002 Kamachi
2002/0007319 A1 1/2002 Yu
2002/0026388 A1 2/2002 Roebuck
2002/0035480 A1 3/2002 Gordon
2002/0035593 A1 3/2002 Salim
2002/0043568 A1 4/2002 Hess
2002/0065870 A1 5/2002 Baehr-Jones
2002/0095586 A1 7/2002 Doyle
2002/0096831 A1 7/2002 Nakayama
2002/0097856 A1 7/2002 Wullert
2002/0116466 A1 8/2002 Trevithick
2002/0124137 A1 9/2002 Ulrich
2002/0130904 A1 9/2002 Becker
2002/0135618 A1 9/2002 Maes
2002/0169665 A1 11/2002 Hughes
2002/0184373 A1 12/2002 Maes
2002/0184391 A1 12/2002 Phillips
2002/0188688 A1 12/2002 Bice
2003/0008712 A1 1/2003 Poulin
2003/0014297 A1 1/2003 Kaufman
2003/0032476 A1 2/2003 Walker
2003/0050977 A1 3/2003 Puthenkulam
2003/0055892 A1 3/2003 Huitema
2003/0056002 A1 3/2003 Trethewey
2003/0076353 A1 4/2003 Blackstock
2003/0101343 A1 5/2003 Eaton
2003/0112952 A1 6/2003 Brown
2003/0135621 A1 7/2003 Romagnoli
2003/0141977 A1 7/2003 Brown
2003/0145128 A1 7/2003 Baird
2003/0149675 A1 8/2003 Ansari
2003/0177187 A1 9/2003 Levine
2003/0195957 A1 10/2003 Banginwar
2003/0210265 A1 11/2003 Haimberg
2004/0014514 A1 1/2004 Yacenda
2004/0054667 A1 3/2004 Kake
2004/0059781 A1 3/2004 Yoakum
2004/0078432 A1 4/2004 Manber
2004/0078596 A1 4/2004 Kent
2004/0088303 A1 5/2004 Elder
2004/0097287 A1 5/2004 Postrel
2004/0103079 A1 5/2004 Tokusho
2004/0113756 A1 6/2004 Mollenkopf
2004/0127277 A1 7/2004 Walker

(56) References Cited

U.S. PATENT DOCUMENTS

2004/0128181 A1 7/2004 Zurko
2004/0172339 A1 9/2004 Snelgrove
2004/0174392 A1 9/2004 Bjoernsen
2004/0186886 A1 9/2004 Galli et al.
2004/0205134 A1 10/2004 Digate
2004/0210627 A1 10/2004 Kroening
2004/0228291 A1 11/2004 Huslak
2004/0244006 A1 12/2004 Kaufman
2004/0260771 A1 12/2004 Gusler et al.
2005/0015571 A1 1/2005 Kaufman
2005/0021484 A1 1/2005 Bodin
2005/0027696 A1 2/2005 Swaminathan
2005/0050137 A1 3/2005 Bodin
2005/0060368 A1 3/2005 Wang
2005/0071428 A1 3/2005 Khakoo
2005/0071462 A1 3/2005 Bodin
2005/0080859 A1 4/2005 Lake
2005/0091380 A1 4/2005 Gonen
2005/0097440 A1 5/2005 Lusk
2005/0132009 A1 6/2005 Solie
2005/0138108 A1 6/2005 Galvin
2005/0149620 A1 7/2005 Kirkland
2005/0165893 A1 7/2005 Feinberg
2005/0216346 A1 9/2005 Kusumoto
2005/0223075 A1 10/2005 Swearingen et al.
2005/0246711 A1 11/2005 Berstis
2005/0277472 A1 12/2005 Gillan
2006/0003305 A1 1/2006 Kelmar
2006/0004659 A1 1/2006 Hutchison
2006/0026253 A1 2/2006 Kessen
2006/0031322 A1 2/2006 Kessen
2006/0031326 A1 2/2006 Ovenden
2006/0036688 A1 2/2006 McMahan
2006/0121990 A1 6/2006 O'Kelley
2006/0128460 A1 6/2006 Muir
2006/0129643 A1 6/2006 Nielson
2006/0155813 A1 7/2006 Dietz et al.
2006/0161852 A1 7/2006 Chen
2006/0178968 A1 8/2006 Jung
2006/0184260 A1 8/2006 Graepel
2006/0190591 A1 8/2006 Bobde
2006/0252526 A1 11/2006 Walker
2007/0026934 A1 2/2007 Herbrich
2007/0066403 A1 3/2007 Conkwright
2007/0073582 A1 3/2007 Jung
2007/0106526 A1 5/2007 Jung
2007/0111789 A1 5/2007 van Deursen
2007/0112624 A1 5/2007 Jung
2007/0112706 A1 5/2007 Herbrich
2007/0117623 A1 5/2007 Nelson
2007/0130001 A1 6/2007 Jung
2007/0168444 A1 7/2007 Chen
2007/0168447 A1 7/2007 Chen
2007/0180040 A1 8/2007 Etgen
2007/0265718 A1 11/2007 Graepel
2007/0298867 A1 12/2007 Huang
2008/0019353 A1 1/2008 Foote
2008/0059304 A1 3/2008 Kimsey
2008/0064467 A1 3/2008 Reiner
2008/0076527 A1 3/2008 Low
2008/0096623 A1 4/2008 Fujii
2008/0113815 A1 5/2008 Weingardt
2008/0126350 A1 5/2008 Shoemaker
2008/0155019 A1 6/2008 Wallace
2008/0176655 A1 7/2008 James
2008/0207329 A1 8/2008 Wallace
2008/0214287 A1 9/2008 Lutnick
2008/0242420 A1 10/2008 Graepel
2008/0254893 A1 10/2008 Patel
2008/0270605 A1 10/2008 Berstis
2008/0270916 A1 10/2008 Chen
2008/0301405 A1 12/2008 Kaufman
2009/0005172 A1 1/2009 Shibahara
2009/0075738 A1 3/2009 Pearce
2009/0113448 A1 4/2009 Smith
2009/0137320 A1 5/2009 Kimura
2009/0253494 A1 10/2009 Fitch
2009/0325711 A1 12/2009 Bronstein
2010/0306672 A1 12/2010 McEniry
2011/0190063 A1 8/2011 Kajii
2011/0201395 A1 8/2011 Bansi
2012/0021825 A1 1/2012 Harp
2013/0288766 A1* 10/2013 Terashima ............ A63F 13/005 463/16
2013/0296046 A1 11/2013 Mianji
2014/0004955 A1 1/2014 Nahari
2014/0004960 A1 1/2014 Soti
2014/0011595 A1 1/2014 Muller
2014/0162763 A1 6/2014 Kim
2014/0162781 A1 6/2014 Butler
2014/0344725 A1 11/2014 Bates
2014/0349753 A1 11/2014 Imai
2015/0031440 A1* 1/2015 Desanti ................. A63F 13/822 463/25
2015/0038233 A1 2/2015 Rom
2015/0310698 A1 10/2015 Polis
2016/0001181 A1 1/2016 Marr
2016/0001182 A1 1/2016 Marr
2016/0001186 A1 1/2016 Marr
2016/0005270 A1 1/2016 Marr
2016/0191671 A1 6/2016 Dawson
2016/0296840 A1 10/2016 Kaewell

FOREIGN PATENT DOCUMENTS

CA 2143874 6/2000
CA 2292678 7/2005
CA 2552135 7/2013
CN 1334650 A 2/2002
CN 1202652 C 10/2002
CN 1141641 C 3/2004
CN 1494679 A 5/2004
CN 1219384 9/2005
CN 1307544 3/2007
CN 100407675 7/2008
CN 100423016 C 10/2008
CN 100557637 11/2009
CN 101001678 B 5/2010
CN 101436242 12/2010
CN 101801482 B 12/2014
EP 668583 8/1995
EP 0627728 B1 9/2000
EP 0717337 B1 8/2001
EP 1207694 A2 5/2002
EP 1209849 A2 5/2002
EP 0679977 B1 10/2002
EP 0679978 B1 3/2003
EP 0890924 B1 9/2003
EP 1377902 B1 8/2004
EP 0813132 B1 1/2005
EP 1380133 B1 3/2005
EP 1021021 B1 9/2005
EP 0930584 B1 10/2005
EP 0883087 B1 8/2007
EP 1176828 B1 10/2007
EP 2076888 B1 7/2015
GB 2339938 10/2002
GB 2352154 7/2003
JP H11191097 A 4/1999
JP 11191097 7/1999
JP 3033956 B2 4/2000
JP 3124916 B2 1/2001
JP 2001119403 A 4/2001
JP 3177221 B2 6/2001
JP 2001204973 A 7/2001
JP 3199231 B2 8/2001
JP 2001230883 A 8/2001
JP 3210558 B2 9/2001
JP 3275935 2/2002
JP 3361745 1/2003
JP 3368188 B2 1/2003
JP 3470955 B 9/2003
JP 3503774 12/2003
JP 2004062539 A 2/2004

(56) References Cited

FOREIGN PATENT DOCUMENTS

| | | | |
|---|---|---|---|
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5550720 | B2 | 7/2014 |
| JP | 2015002839 | A | 1/2015 |
| JP | 5734566 | B2 | 6/2015 |
| KR | 20020038229 | A | 5/2002 |
| KR | 20030039019 | A | 5/2003 |
| MY | 117864 | A | 8/2004 |
| SG | 55396 | | 12/1998 |
| TW | 424213 | | 3/2001 |
| TW | 527825 | | 4/2003 |
| TW | 200836091 | | 9/2008 |
| TW | 200937926 | | 9/2009 |
| TW | 201002013 | | 1/2010 |
| TW | 201009746 | | 3/2010 |
| TW | 201024997 | | 7/2010 |
| TW | 201028871 | | 8/2010 |
| WO | 0060444 | A1 | 10/2000 |
| WO | 0062231 | A1 | 10/2000 |
| WO | 0137162 | A2 | 5/2001 |
| WO | 0201455 | A2 | 1/2002 |
| WO | 0203645 | A2 | 1/2002 |
| WO | 2002073457 | | 9/2002 |
| WO | 20020087156 | | 10/2002 |
| WO | 03044755 | A1 | 5/2003 |
| WO | 03049459 | A1 | 6/2003 |
| WO | 03058518 | A2 | 7/2003 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

OTHER PUBLICATIONS www.hattrick.org rules section Jul. 1, 2009.

Office Action dated Jan. 6, 2012 for U.S. Appl. No. 12/707,984.

Office Action dated Jul. 24, 2013 for U.S. Appl. No. 12/707,984.

Office Action dated Mar. 13, 2014 for U.S. Appl. No. 12/707,984.

Office Action dated Dec. 19, 2014 for U.S. Appl. No. 12/707,984.

Notice of Allowance dated Sep. 17, 2015 for U.S. Appl. No. 12/707,984.

International Search Report as Published as WO2005/079538 in corresponding international application No. PCT/US2005/005550, dated Jul. 5, 2006.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp= &arnumber- =1266179&isnumber=28322http://ieeexplore.ieee.org/xpl/absprintf.jsp?arnumb- er=1266179.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.

IBM developer Works, OptimalGrid—autonomic computing on the Grid, James H. Kaufman; Tobin J. Lehman; Glenn Deen; and John Thomas, Jun. 2003.

IBM, Transcoding: Extending e-business to new environments, Britton et al., Sep. 22, 2000.

Lee et al., "A Self-Adjusting Data Distribution Mechanism for Multidimensional Load Balancing in Multiprocessor-Based Database Systems," Information Systems vol. 19, No. 7, pp. 549-567, 1994.

Ma et al., "A Scalable Parallel Cell-Projection vol. Rendering Algorithm for Three-Dimensional Unstructured Data", IEEE 1997, pp. 1-10.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

Hassen et al., "A Task-and Data-Parallel Programming Language Based on Shared Objects," ACM Transactions on Programming Languages and Systems, vol. 20, No. 6, Nov. 1998, pp. 1131-1170.

Andert, "A Simulation of Dynamic Task Allocation in a Distributed Computer System," Proceedings of the 1987 Winter Simulation Conference, 1987, pp. 1-9.

K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

Office Action dated Mar. 24, 2017 for U.S. Appl. No. 14/712,514.

Office Action dated Jan. 20, 2017 for U.S. Appl. No. 14/712,566.

Notice of Allowance dated Jun. 14, 2017 for U.S. Appl. No. 14/712,566; (pp. 1-9).

Office Action dated Feb. 13, 2017 for U.S. Appl. No. 14/712,541.

Office Action dated Aug. 7, 2017 for U.S. Appl. No. 14/712,541; (pp. 1-16).

Office Action dated Oct. 19, 2017 for U.S. Appl. No. 14/712,514; (pp. 1-12).

Office Action dated Mar. 14, 2018 for U.S. Appl. No. 14/712,541 (pp. 1-16).

Office Action dated Mar. 14, 2018 for U.S. Appl. No. 15/703,757.

Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.

V. Stojanovic, "Virtual boutique—try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol. 2.

Roaming Virtual World Is a Real Trip; [Final Edition] Leslie Walker. The Washington Post. Washington, D.C.: Mar. 30, 2006.

E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.

Kautz, H., B. Selman, M. Shah.. "Referral Web: Combining Social Networks and Collaborative Filtering". Communications of the ACM, vol. 40, No. 3, Mar. 1997.

Schwartz, M. F., D. C. M. Wood. "Discovering shared interests among people using graph analysis of global electronic mail traffic". Department of Computer Science, University of Colorado, Boulder CO. Oct. 1992.

Wellman, B. "For a social network analysis of computer networks: a sociological perspective on collaborative work and virtual community". Proceedings of the 1996 conference on ACM SIGCPR/SIGMIS. 1-11.

Qureshi, S. "Supporting electronic group processes: a social perspective". Proceedings of the 1995 ACM SIGCPR Conference on Supporting teams, groups, and learning inside the IS function. ACM Press. 24-34.

Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Garton, L., C. Haythornthwaite, B. Wellman. "Studying on-line social networks in Doing Internet Research", Jun. 1997.

(56) References Cited

OTHER PUBLICATIONS

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. ACM Press. 182-236.
"Universally Unique Identifier", 2006 (http://en.wikipedia.org/wiki/UUID).
Office Action dated May 24, 2018 for U.S. Appl. No. 14/712,359 (pp. 1-20).

* cited by examiner

1007
Reward Pool Module
1006
Supply Drop Module
Content Data for Reward Packs

SYSTEM AND METHOD FOR OPTIMIZING VIRTUAL GAMES

CROSS-REFERENCE

The present application relies on U.S. Patent Provisional Application No. 62/427,674, of the same title, and filed on Nov. 29, 2016, for priority, which is herein incorporated by reference in its entirety.

FIELD

The present specification is related generally to the field of gaming, animation and computer graphics. More specifically the present specification is related to a software application that can be used by developers to design video games in a manner that optimizes user engagement and retention.

BACKGROUND

In certain role-playing video games, players control the actions of one or more characters, with the objective of developing unique character profiles that accumulate various objects and abilities through extended play. The rules for how quickly, how many, and what type of abilities are obtained and/or how quickly, how many, and what type of objects a character may find or receive involve several different variables, ratings or statistics, collectively parameters. These parameters determine the outcome of various chance or future events that lead to new objects and abilities.

The proper selection of these parameters is very challenging, however. First, video games may have an endpoint where the user's enjoyment stagnates because the user has achieved the biggest challenge possible or has used all of the assets available to him or her in achieving an objective. Users also have a tendency to be discouraged if they do not win or acquire any assets in a few consecutive games, if they perceive a game level to be too complex, or if the game rewards are not forthcoming. Additionally, some players are not always engaged, playing only intermittently. Especially in the smart device market segment, players are very time sensitive and tend to skip or switch to another game, application, channel or webpage whenever they do not feel sufficiently engaged with a game. As such, the improper selection of parameters may lead to a player becoming unengaged because they do not win or acquire any assets, they perceive a game level to be too complex, or the game rewards are not forthcoming.

Second, to properly engage users, the reward system of a video game must be fair and consistent. The improper selection of parameters can easily skew the reward system of a game by giving new users too many assets, at the expense of established users or vice-versa, by granting too many tokens, awards, objects, or abilities to one subset of users relative to another subset of users, or by assigning too much, or too little, value to a particular actions, challenge, objective or object. If the reward system of a game becomes corrupted in this fashion, players tend to feel the game is unfair, leading to disengagement.

Third, the selection of parameters should still preserve the randomness of value creation and activities within a game, thereby avoiding any express or implicit favoring of one subset of players relative to another, while still limiting the randomness to being within certain bounds, thereby avoiding excessively large, or small, rewards.

Thus, there is a need for methods and systems that can assist video game developers in designing video games that maximize user engagement and retention by proactively modeling the effect of certain gaming parameters within a game. There is also a need for methods and systems that can assist video game developers in predicting how a plurality of gaming parameters will affect the reward system of a game, user engagement and user retention. It is also desired that such a system is easily accessible to the developers and provides a user friendly interface.

SUMMARY

The present specification is directed toward a computer-implemented method for simulating a game environment to determine one or more appropriate boundary conditions for awarding virtual game items to a plurality of players, said method being implemented in a computer having a processor and a random access memory, wherein said processor is in data communication with a display and with a storage unit, the method comprising: forming a pool of virtual game items, wherein each of said virtual game items belongs to a category; establishing a lower boundary condition and an upper boundary condition for each category of said virtual game items; for each of said plurality of players and during a game session, randomly selecting a value between said lower boundary condition and upper boundary condition for a given category of said virtual game items and associating said value to said category of said virtual game items; for each of said plurality of players and during the game session, modifying each value associated with each category of said virtual game items to yield, for each category, a modified value; for each of said plurality of players and during the game session, determining, for each category, if the modified value meets the lower boundary condition or the upper boundary condition; for each of said plurality of players and during the game session, if the modified value meets the lower boundary condition or the upper boundary condition for one category, awarding a virtual game item from said one category; and for each of said plurality of players and during the game session, if, for any of the categories, none of the modified values meet the lower boundary condition or upper boundary condition, allocating an alternative award.

The game session may be a simulated game session, said simulated game session using historical player data to determine actions of each of said plurality of players. Optionally, the computer-implemented method further comprises generating a graphical user interface output of said simulated game session, said graphical user interface output comprising at least one of 1) a plot representing an average number of categories of items purchased or awarded as a function of a game number, 2) a histogram showing a distribution of when an average of said plurality of players obtained a first game item in the simulated game session, 3) data representative of an accumulation of virtual game currency, 4) data representative of an acquisition of a number of each type of game item, 5) data representative of a degree of rarity or commonness of game items obtained, 6) data representative of a number of reward packs obtained by said plurality of players as a function of a number of simulated game sessions played, and 7) data representative of a rarity or commonness of a number of reward packs obtained by said plurality of players as a function of a number of simulated game sessions played. Optionally, the computer-implemented method further establishes modifying at least one of the lower boundary condition and the upper boundary condition for at least one category of said virtual game items based upon said graphical user interface output of said simulated game session.

The pool of virtual game items may be formed based upon at least one of three value types. Optionally, a first of said three value types is a value received by a player based upon a function of how long said player played a game or a function of whether said player won or lost the game. Optionally, a second of said three value types is a value received by a player for completing a mission, a challenge, or other discrete objective or goal in a game. Optionally, a third of said three value types is a value randomly received by a player or a value purchased by a player.

Optionally, the computer-implemented method further comprises, for each of said plurality of players, if, for more than one category, more than one of the values meets or exceeds the lower boundary condition or the upper boundary condition, awarding a virtual game item from a category associated with one value of said more than one of the values that most exceeds its lower boundary or upper boundary condition.

Optionally, the computer-implemented method further comprises, for each of said plurality of players and during the game session, after awarding a virtual game item from said one category, randomly selecting a new value between said lower boundary condition and upper boundary condition for said one category of said virtual game items and associating said new value to said one category of said virtual game items.

Optionally, modifying each value is performed by decrementing said value by a predefined amount and determining, for each category, if the modified value meets the lower boundary condition or the upper boundary condition is performed by determining if the decremented value meets or exceeds the lower boundary condition.

Optionally, modifying each value is performed by incrementing said value by a predefined amount and determining, for each category, if the modified value meets the lower boundary condition or the upper boundary condition is performed by determining if the incremented value meets or exceeds the upper boundary condition.

The alternative award may be virtual currency.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings.

DETAILED DESCRIPTION

Figure 1:
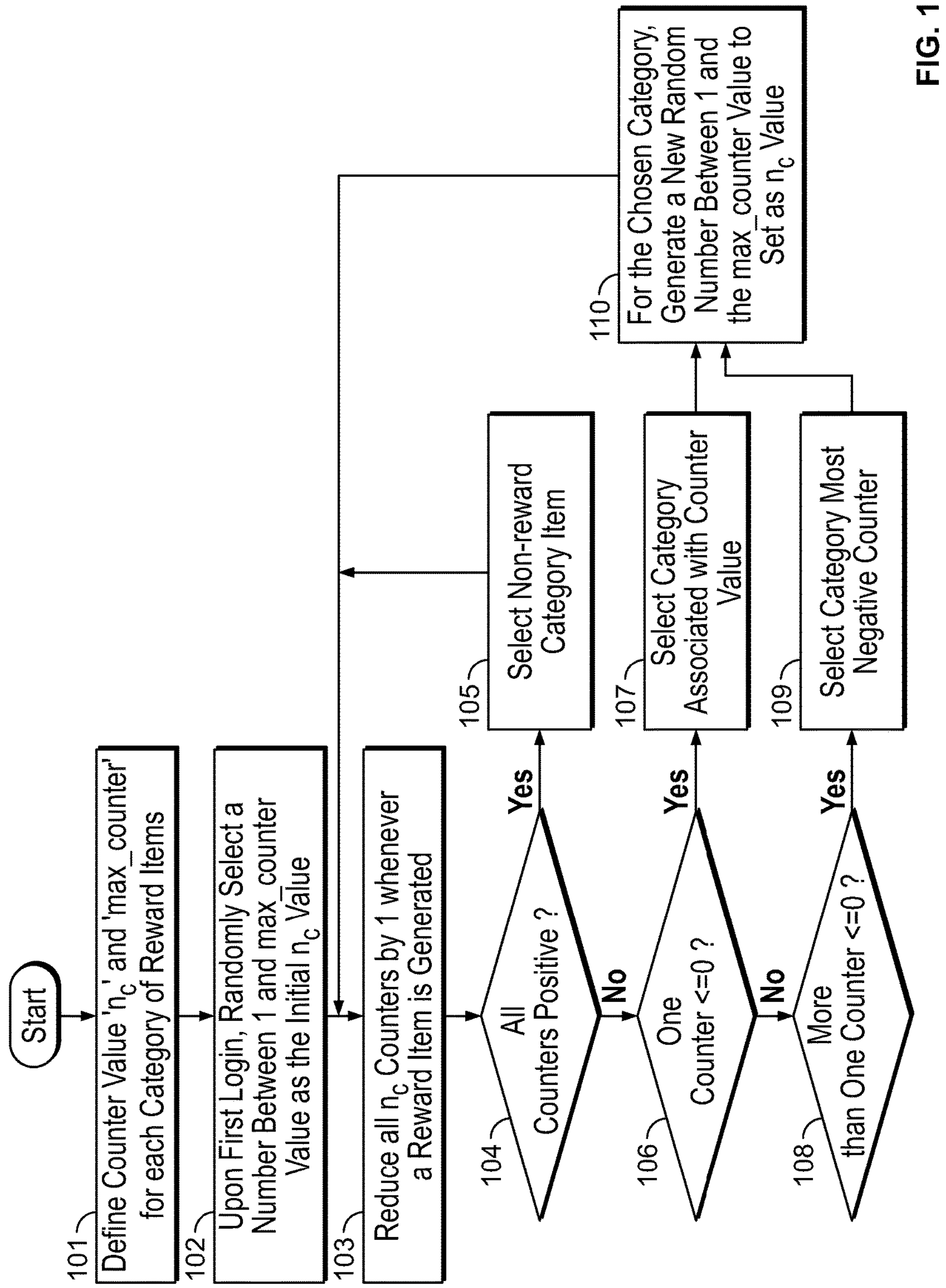
FIG. 1 is a flowchart illustrating an exemplary method of generating reward items in a game, according to one embodiment of the present specification.

The present specification describes a system comprising a software tool that facilitates the design of reward based games. In one embodiment, the tool assists the game developers in designing a true randomized, non-biased and neutral gaming environment that is bounded so that extremes of disincentives and excess incentives are avoided.

In one embodiment, the software tool allows for simulating a game environment and generates variables that enable reward acquisition by players. In another embodiment, the software tool allows for simulation of other aspects of the game, such as those governing game progression or virtual game currency. In one embodiment, the software tool allows the game systems to be defined in such a way that an agent, such as an artificial player implemented by a computer program, can interact with the game environment. In one embodiment, the software tool uses generative models driven by data from previous versions of a game to define the behavior of such agents in simulated games.

In one embodiment, the present system allows the recording of metrics for each agent in the simulation tool, and an aggregate of metrics generated by all the agents is presented to the user (game developer). These metrics may be analyzed to design the game such that player engagement is maximized. In one embodiment, the software tool may be accessed via a web based user interface, so that input parameters and results may be efficiently shared by all members of a design team.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

In all embodiments herein, it should be appreciated that the software tool comprises a plurality of programmatic instructions that is stored in a non-transient memory and is preferably, but not necessarily, executed on a computer with a processor having a minimum CPU clock speed of 2.7 GHz and a preferred minimum amount of local RAM is 16 GB. It is further preferred that the computer is in data communication with at least one database that adapted to store the game parameters. Alternately, the game parameters may be stored on the computer memory itself. Additionally, a display is in data communication with the processor and preferably that display has a minimum screen resolution of 1920×1080p. Operationally, the software tool interacts with a server that is responsible for hosting, running, or executing the game being simulating using a backend communication software such as demonware via xmlrpc. During the simulations described herein, the software tool requests and obtains the requisite data from the server and uses that data to generate the interfaces, predictions, and other outputs described herein.

It may be noted that the simulation tool of the present specification may be run on a user's personal computing device, such as a laptop or a tablet PC. For the purpose of collaboration with other game developers, the system of present specification includes a web-based user interface, which in one embodiment, runs on a separate server that multiple users can access via a web browser.

In one embodiment, the game simulation and design tool of the present specification supports games that, in the course of game play, include variables such as total points, coins or tokens, player experience level (XP), a game level, a rate or extent of increasing from one game level to a higher game level, health status of a game character, strength of a game character, abilities of a game character, objects owned by a game character, and/or weapons owned by a game character. For such games, the present software tool simulates and analyzes how a particular set of parameters impact various aspects of a game, including but not limited to 1) the accumulation of one or multiple types of virtual game currency, such as currency acquisition per unit of game play time and bonuses for wins or other game achievements, 2) the acquisition of certain items or game currency through the exchange of other game items, including the destruction of duplicate items, 3) the acquisition of rewards, such as by accumulating various types of game items, completing game objectives or goals, or acquiring items through the direct spending of game currency.

In one embodiment, the software tool of the present specification allows for the simulating and design of a supply drop feature in a game, which grant game items or game currency in a randomized way. As known in the art, a supply drop in a game is a mechanism of granting a player a plurality of different types and numbers of items for use in a game. The types, numbers and values of the game items are preferably randomly provided, but within certain bounds, thereby insuring fair (random) game play but not risking the excessively high or low rewarding of users.

To mirror this objective, the present software tool provides multiple options for the method by which the items will be randomly drawn during game play. According to one aspect of the present system for example, items may be drawn from multiple groups, with each group having a fixed probability of being selected. According to another aspect, it may be possible to select the item group via a counter value method, wherein the maximum number of draws allowed is set before a given group of items is chosen. The probability of getting an item from the group in a smaller number of draws than the maximum is set to be independent of the draw number. For the counter value method, the system uses a formula to initialize the draw numbers for new players, in order to prevent them from having unusually poor item acquisition and becoming disengaged with the game. After a group of items is chosen, the process may be repeated as desired, with the items being further divided into subgroups. Otherwise, one of the specific items in the group is selected to be drawn by the player, with each item having an equal chance of being selected.

In one embodiment, the present game design and simulation tool allows the game systems to be defined in such a way that an agent, such as an artificial player implemented by a computer program, can interact with the game environment. The present software tool uses generative models driven by data from previous versions of a game to define the behavior of such agents in simulated games. In one embodiment, the parameters related to agent behavior may be derived from user behavior data in prior game titles.

As such, the software tool allows simulated players or agents to interact with the game's systems according to a number of parameters derived from prior user data, including but not limited to:

Probability of playing in different types of matches;

Probability of winning or losing in each game;

Logic for determining how the agent spends its virtual game currency;

Logic for determining how and when the agent trades its game items for game currency;

Games the agent plays per simulated day;

Rate for the agent to make simulated purchases with game currency or real money; and Probabilities and rates for players to achieve game objectives.

In one embodiment, the present tool provides the capability to set an agent to exactly mimic the actions of a specific real player from a previous game, and replicate the feature for a large number of agents and players simultaneously. For example, if an actual player in Game X traded game items after playing 10 games, 20 games, and 27 games, the software tool generates a virtual player or agent to be set up to follow this behavior for a simulation of Game Y.

While game data and parameters may be artificially generated for the purpose of simulation, in another embodiment, actual game data and parameters are obtained directly from the game's backend, rather than by generating them in the simulation. For example, the software tool requests and obtains data for variables such as the numbers and types of supply drops, the amount of play time spent by different players, amount of money spent by different players, among other variables, from the game server and uses that player data to simulate a new game. One of ordinary skill in the art would appreciate that such data is part of the standard set of data that is stored on separate servers for any game.

In one embodiment, after each simulated game played by an agent, key metrics of interest about the agent are recorded by the present game design system. Examples of such metrics include, but are not limited to, 1) the number of different item types obtained, 2) the number of items or rewards purchased, 3) the number of each type of item granted on average, 4) the quantities of game currencies held, 5) the quantity of player experience (XP) earned, 6) the items obtained from the rarest tier of game items, 7) the number of duplicate items obtained, 8) the amount of player health earned or expended, 9) the amount of player strength earned or expended, or 10) any player characteristics that may increase or decrease in the course of game play. It may be appreciated that as many metrics as are relevant may be generated after a game simulation.

After the games for all agents have been simulated, the above metrics are aggregated over all agents, and presented to the user (game developer) in a graphical manner. The statistics may include, for example, a plot representing the average number of specific categories of items purchased or awarded as a function of the game number or a histogram showing the distribution of when the virtual players obtained their first weapons in a combat game. These statistics may be used by the game developers, for example, to ensure that the game does not produce rewards in a manner that discourages users, over-rewards users, or makes a player strongest by simply purchasing all assets and/or rewards.

Some other examples of statistics that may be generated by the game simulation in graphical form include, but are not limited to:

Amount of a given type of game currency earned, by source, as a function of number of games played; Fraction of the total number of reward items which may be acquired, for each kind of reward item, as a function of number of games played;

Fraction of the total number of reward items which have been acquired, for each kind of reward item, as a function of number of games played;

Fraction of the items obtained which are duplicate, for each kind of item, as a function of number of games played; etc.

In one embodiment, the game design and simulation system of the present specification includes an online user interface to facilitate the use of the simulation tool by a game development team. This interface allows a game developer to access various features and perform a variety of analysis and design tasks with the tool, such as setting various simulation parameters, including game parameters as well as the parameters governing the properties of the agents, running a simulation for a specified number of games and virtual players or agents, viewing statistics resulting from the simulation in a desired format such as plots, graphs or tables, saving a set of parameters, so that they may be loaded again either by the same user, or by another user on the team, and downloading a set of parameters in a desired format such as a spreadsheet.

The functional utility of the game design and simulation tool of the present specification will be better understood by its application to an exemplary game, as explained in the following sections. For the purpose of the present example, a massively multiplayer online role-playing game, in which a very large number of players interact with each other, via virtual characters, within a virtual world, is considered but it should be appreciated that the software tool is applicable to any other type of game which rewards users with random benefits.

In one embodiment, the game in the present example uses three value types to determine the scope, extent, mix, type and/or number of game items. The first value type is defined as the value received by a player based upon a function of whether or how long the player played a game and/or a function of whether the player won the game or lost the game. For example, a player may receive a*b*t currency at end of match, where t is how long the player was in the match, a is a set universal multiplier, and b is 1 if the match was lost, and a fixed win multiplier greater than 1 if the match was won. It should be appreciated that the programmatic instructions which define the operation of the game are defined such that, upon execution, the amount of time a user plays the game is tracked, via an internal clock, whether a user initiates game play is tracked and stored in memory, and the outcome of the game, including a score, a winner, and a loser is tracked and stored in memory.

As an example of use of simulation tool of the present specification, the first value type may correspond to virtual game currency. Simulated players receive game currency per minute of game play. The simulation tracks the game currency received for each player, and may have the players spend the currency on a purchase of various reward items. The simulation will then grant the players the reward items acquired. Further, this data about acquired reward items is also recorded by the simulation, and so on.

The second value type may be defined as value received for completing a mission, a challenge, or other discrete objective or goal in a game. In one embodiment, the second value type may be acquired from game items or rewards, by disposing of duplicate rewards or items, and/or by simply logging into the game. It should be appreciated that the programmatic instructions which define the operation of the game are defined such that, upon execution, a user's actions are tracked in the game, including saving into memory data representative of completing the missions, challenges, or other discrete objectives or goals.

The third value type may be defined as value that is randomly generated, within certain predefined limitations, in a game or may be defined as items or other value purchased with real world, government recognized currency.

In the course of any given game, a player may acquire several types of game items as rewards. Various types of game items that may be acquired include, but are not limited to virtual game currency, weapons, tools, cosmetic consumables, calling cards, player gear, emblem shapes, different types or levels of gameplays, and care packages. Reward items may also include team items for a mission team, in case of team games. For example, for the "Superhero" team, the team items might include Superhero weapons, Superhero gear, cosmetic consumables, among other virtual items.

Typically, an item in the reward pool is identified using data representative of an identifier, such as an ID number and/or a tag, which indicate the type of item and its availability in terms of how frequently the item may be found, i.e. whether it is commonly available, somewhat available, or rarely available. Thus, for example, if the tag or identifier for an item is (weapon, common, 8), it indicates that the reward item is a weapon, is commonly available and it's ID number is "8". The item ID is used to uniquely determine the item within the pool of elements with the same tag. In one embodiment, a counter system is used to generate the next element in the tag. In one embodiment, once the set of tags have been determined, an ID number is chosen at random from among the set of available items with those tags, with the probability of all items to be chosen being equal.

Operationally, during game play, the programmatic instructions defining the execution of the game generates, for each player, reward packs comprising one or more game items, as described above. The items are randomly picked up by the game logic from the available pool of items. In one embodiment, reward packs may be categorized into various types, and may be acquired by players in several ways. Thus, for example, some reward packs in the exemplary multi-player game may be purchased by the players in exchange for an amount of the first value type. Still another category of reward packs may be purchased by players in exchange for an amount of the second or third value type. Yet another category of reward packs may be granted to a player upon first login to the game. The reward packs may further be categorized depending on the availability, such as commonly available reward packs or rare or premium packs.

In one embodiment, all categories of reward packs are generated by a common game program. Certain categories of reward packs may have separate generation systems, to ensure the inclusion of items relevant to that category. For example, rare reward packs may be generated by separate counter systems, such that these packs include more rare items.

Specific game items, such as tools for game play may be acquired by players in exchange for an amount of the first, second or third value type, where the amount required is a function of the number and type of game items already acquired. In this context, a fourth value type may be defined as the number of units of the first or second or third value type, received by a player for dismantling or disposing of a duplicate item. Then the amount required to acquire a new item is a function of the fourth value type. In one embodiment, the amount required is a constant factor cf times the fourth value type. Thus for example in a war based game, if cf=15, a player will have to dispose of 15 items of a given category and/or availability in order to acquire another item of the same category and/or availability.

FIG. 1 is a flowchart illustrating an exemplary method of generating reward items in a game. The exemplary method uses a counter based system to generate various categories of reward items with equal probability. Referring to FIG. 1, firstly, each category of reward items in the game is associated with a counter value '$n_c$'. A maximum, or boundary condition, for the counter value ('max_counter' value) is also defined. This is shown in 101. Next, when a player logs into the game for the first time, for each category, a number between 1 and max_counter value is randomly chosen as the initial $n_c$ value, with a defined probability. This is shown in 102. It may be noted that even though the counter value is randomly chosen, a probability for each value being chosen is defined in order to equally generate all categories of reward items.

Next in 103, whenever a reward item is generated, all of the $n_c$ counters are reduced by 1. If all of the counter values are positive at this point, a non-reward category of item may be chosen, such as game currency. This is shown in 104 and 105. If one of the $n_c$ values is less than or equal to 0, then the category associated with that $n_c$ value may be chosen instead, as shown in 106 and 107. If more than one $n_c$ value is less than or equal to 0, then the category with the most negative counter value may be chosen, as shown in 108 and 109.

In case several categories have the same $n_c$ value, which less than or equal to 0, the reward category may be chosen by a predefined priority.

Next, in 100, a new random number is generated between 1 and the max_counter value associated with the chosen category. The associated $n_c$ counter value is then set to the generated number to reset it.

Accordingly, the present specification discloses a computer-implemented method for simulating a game environment to determine one or more appropriate boundary conditions (the max counter value) for awarding virtual game items to a plurality of players. The method includes: 1) forming a pool of virtual game items, wherein each game item belongs to a category, 2) establishing a lower boundary condition, e.g. 0 or 1, and an upper boundary condition, e.g. the max counter value, for each category of the virtual game items, 3) for each of the plurality of players and during a game session, randomly selecting a value, e.g. a counter value, between the lower boundary condition, e.g. 0 or 1, and the upper boundary condition, e.g. the max counter value, for a given category and associating the value to the category of the virtual game items, 4) for each of the plurality of players and during the game session, modifying each value, e.g. by decrementing the counter value, associated with each category of the virtual game items to yield, for each category, a modified value, e.g. a counter value minus one, 5) for each of the plurality of players and during the game session, determining, for each category, if the modified value, e.g. decremented counter, meets the lower boundary condition, e.g. 0 or 1, or the upper boundary condition, max counter (noting that the system can be readily designed to count up or count down), 6) for each of the plurality of players and during the game session, if the modified value meets the lower boundary condition or the upper boundary condition for one category, awarding a virtual game item from said one category, and 7) for each of the plurality of players and during the game session, if, for any of the categories, none of the modified values meet the lower boundary condition or upper boundary condition (none of the counter values hit 1 or max counter), allocating an alternative award, such as virtual currency or another token of some kind.

Figure 2:
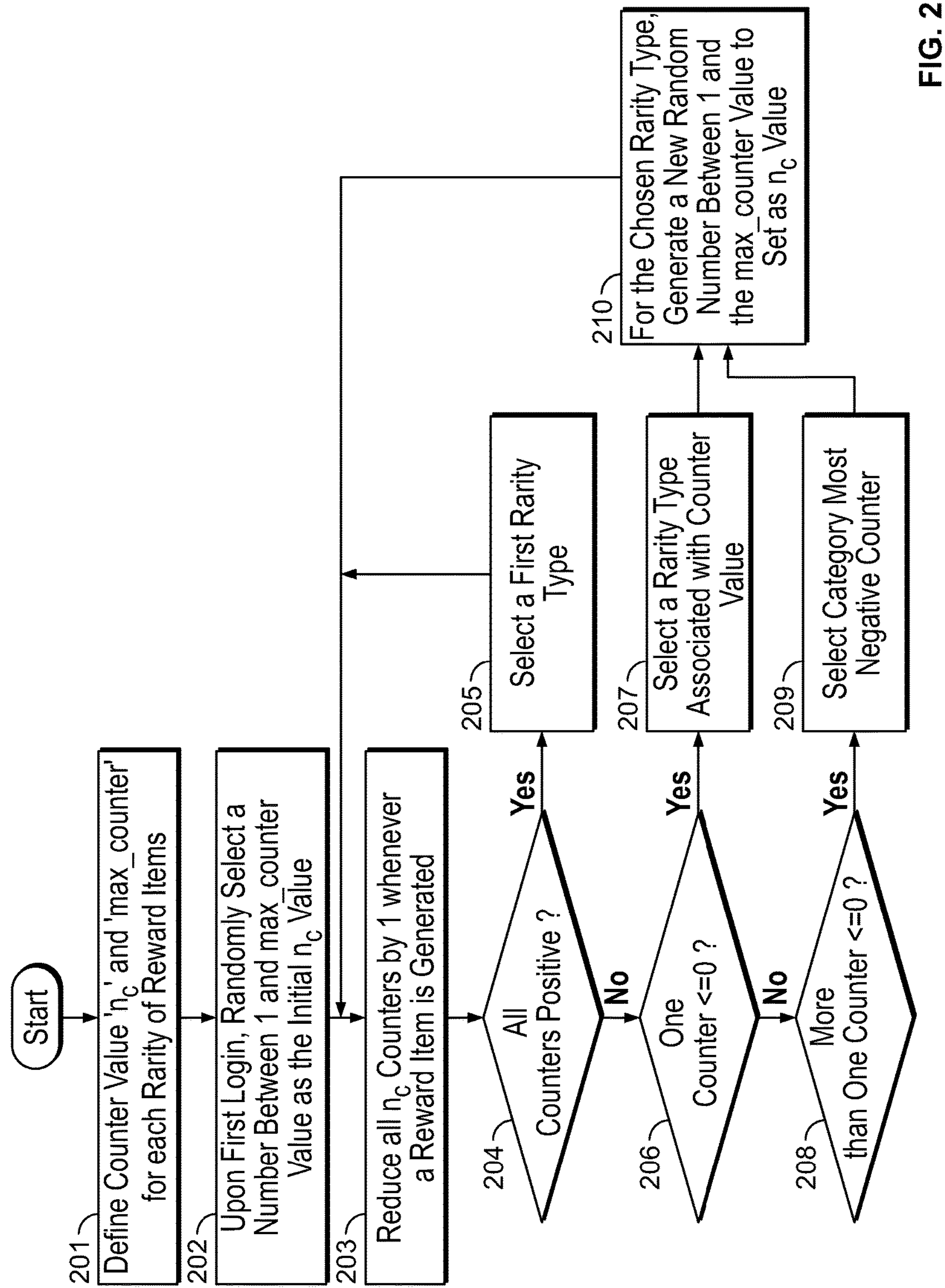
FIG. 2 is another flowchart illustrating an exemplary method of generating reward items in a game.

FIG. 2 is another flowchart illustrating an exemplary method of generating the rarity of a reward item in a game. As in FIG. 1, the exemplary method uses a counter based system to generate rarity or availability of various rarities of reward items, in accordance with the rules and structure of a game. Referring to FIG. 2, firstly, each rarity of reward items in the game is associated with a counter value '$n_c$'. A maximum, or boundary condition, for the counter value (max_counter' value) is also defined. This is shown in 201. Next, when a player logs into the game for the first time, for each rarity, a number between 1 and max_counter value is randomly chosen as the initial $n_c$ value, with a defined probability. This is shown in 202. It may be noted that even though the counter value is randomly chosen, a probability for each value being chosen is defined in order to equally generate all rarities of reward items.

Next in 203, whenever a reward item is generated, all of the $n_c$ counters are reduced by 1. If all of the counter values are positive at this point, a first predefined rarity of item may be chosen. This is shown in 204 and 205. If one of the $n_c$ values is less than or equal to 0, then the rarity (a second rarity) associated with that $n_c$ value may be chosen instead, as shown in 206 and 207. If more than one $n_c$ value is less than or equal to 0, then the rarity with the most negative counter value may be chosen, as shown in 208 and 209. In case several rarities have the same $n_c$ value, which less than or equal to 0, the preferred rarity may be chosen by a predefined priority. Next, in 200, a new random number is generated between 1 and the max_counter value associated with the chosen rarity. The associated $n_c$ counter value is then set to the generated number to reset it.

Thus, after the category of reward items is chosen as in FIG. 1, a similar counter based process is used to choose the rarity or availability. Each rarity is associated with a different counter, just as the different categories are associated different counters in FIG. 1. It may be noted that the rarity counter values exist separately for every category. After choosing a category of reward items as per the process of FIG. 1, the system uses the rarity counters that are associated with the chosen category, to select a rarity value for a given category of reward items. For reward packs designated 'rare' in a game, it is imperative that the system generates at least one item of rare category in the pack. This may be implemented by associating separate sets of counters with 'rare' and 'common' category reward packs. Thus, for example in a 'rare' reward pack, two items may be selected according to a set of counters which includes all rarities, and a third item may be selected from a separate set of counters which does not include common items, and is therefore rare. This method may be customized to generate any number of items in a 'rare' or 'common' reward pack, depending upon the requirements of the game.

One of ordinary skill in the art would appreciate that any number of parallel counter systems may be added to the system logic, to generate a corresponding number of categories or classes of reward items.

Figure 3A:
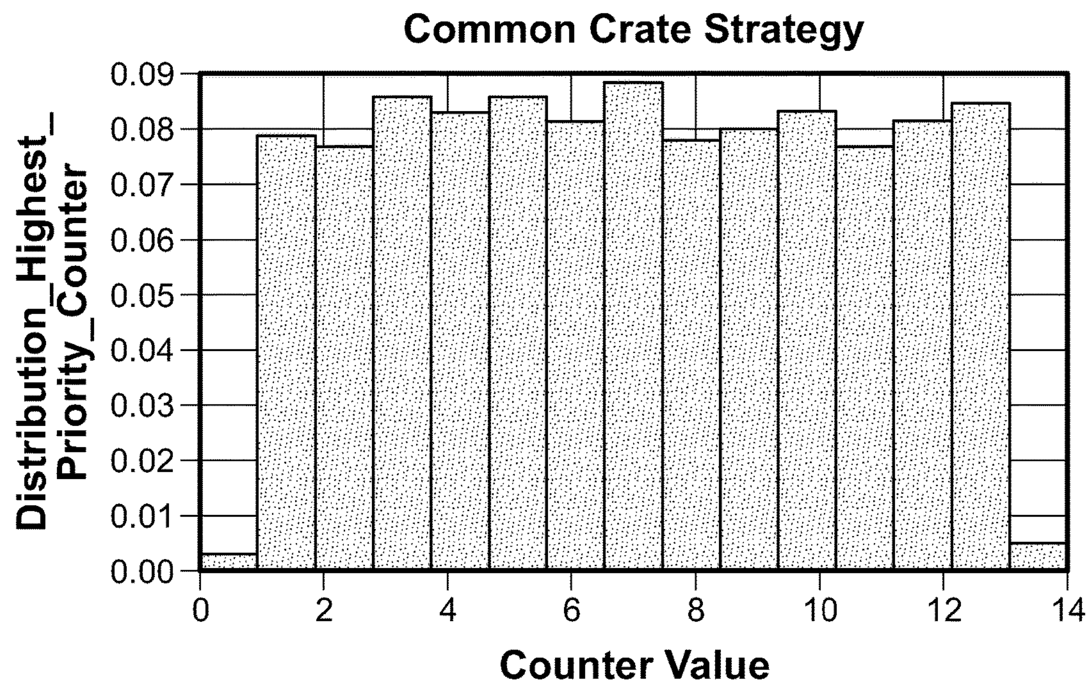
FIG. 3*a* illustrates exemplary reward generation as function of counter values at the beginning of a game.
Figure 3B:
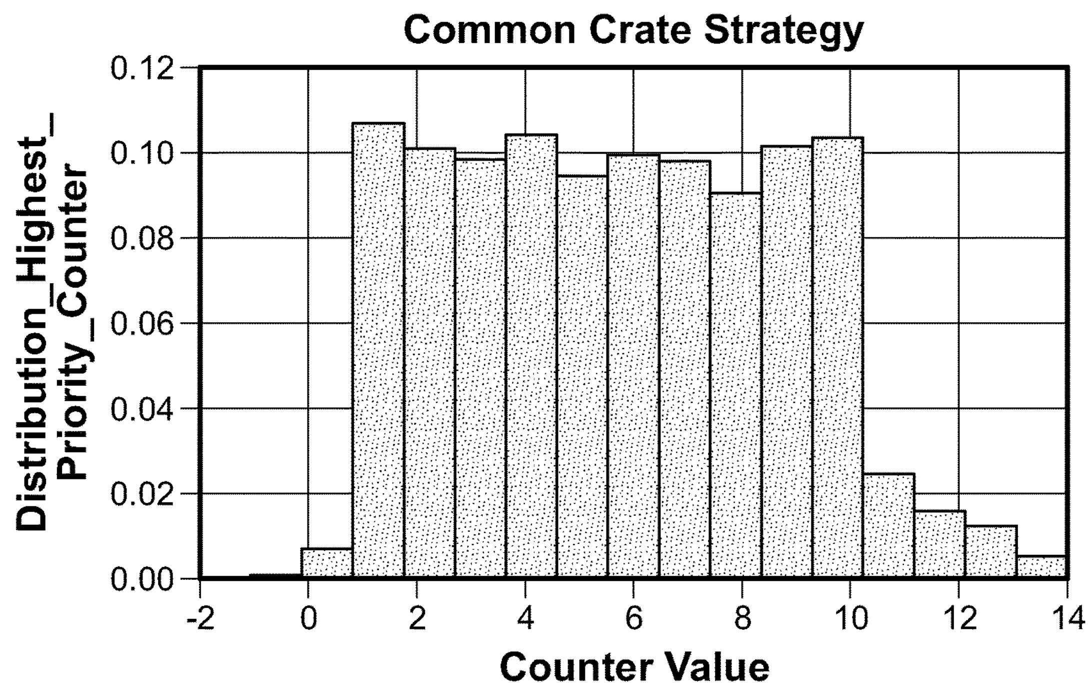
FIG. 3*b* illustrates exemplary reward generation as function of counter values, as the game progresses.
Figure 3C:
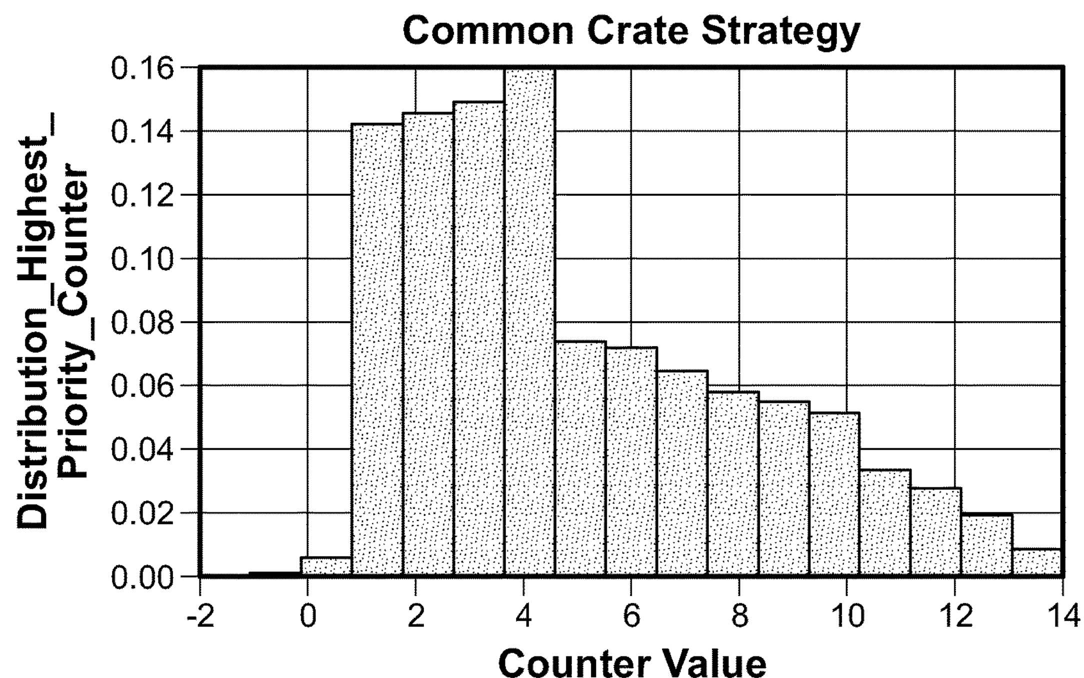
FIG. 3*c* illustrates exemplary reward generation as function of counter values, as the game progresses.
Figure 3D:
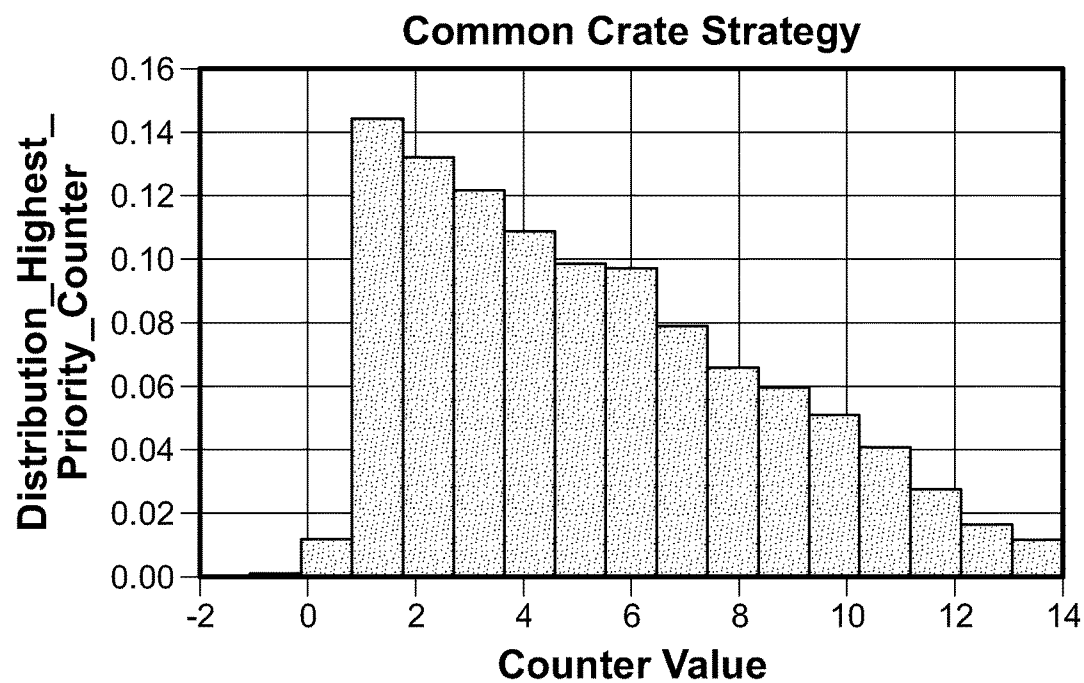
FIG. 3*d* illustrates exemplary reward generation as function of counter values, as the game progresses.

It may be noted that the system needs to be initialized with counter values such that no category of reward items has a greater probability of being generated for acquisition by players. For example, if all counter values are uniformly initialized from the interval (1, max_counter value), players are farther away from receiving non-default category reward items than they would be at typical other times during their playing career. This is illustrated by means of histograms in FIGS. 3*a*, 3*b*, 3*c* and 3*d*, which represent counter values for the highest priority category of items when initializing uniformly. Referring to FIG. 3*a*, the distribution of highest priority counter as a function of counter values is shown, after the first reward generation. FIG. 3*b* illustrates the same distribution after 4 generations, FIG. 3*c* illustrates distribution after 10 generations and FIG. 3*d* illustrates the distribution after 30 generations. As can be seen from the figures, the system progressively reaches an equilibrium state after several instances of reward generations, in which the distribution of the highest priority counters decreases and the counters have a higher probability of being small than at initialization. Because of this, any default-category reward will be generated more often than right after initializing. The present method solves this problem by using a different approach to initializing the counter values, which is illustrated in FIG. 4, which again shows a distribution of highest priority counter as a function of counter values.

Figure 4:
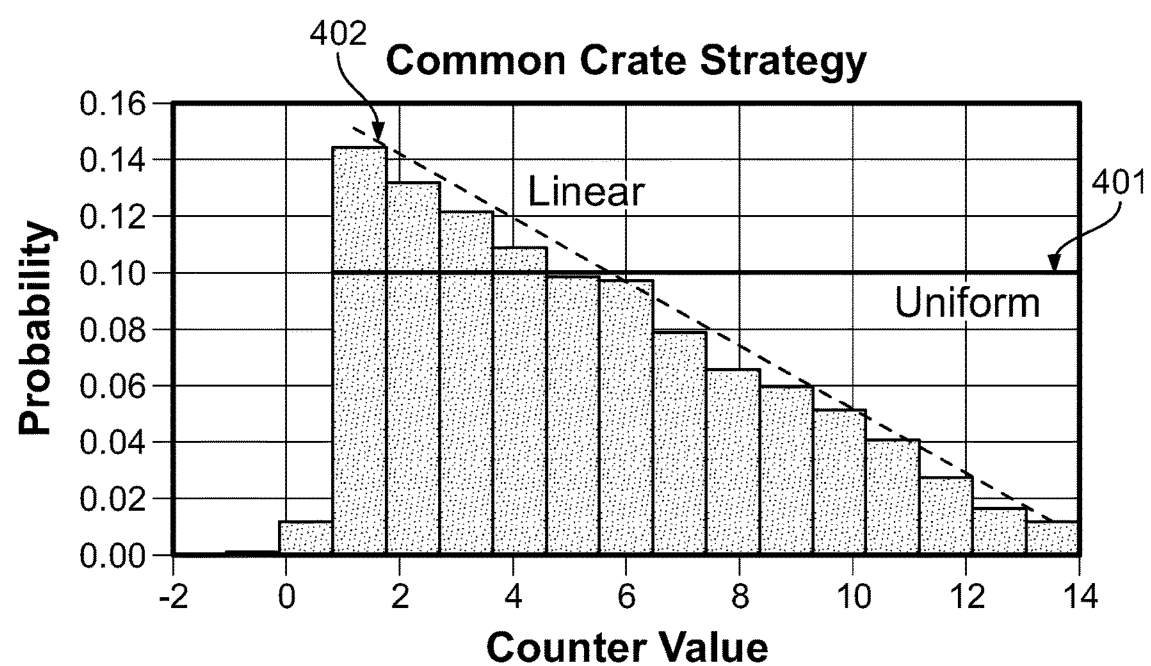
FIG. 4 shows a distribution of a category of rewards as a function of counter values.

Referring to FIG. 4, instead of initializing from the uniform distribution, as illustrated by line 401, the system logic initializes counter values from a linear approximation of the equilibrium distribution, illustrated by line 402. In this manner, it is ensured that all categories of reward items are generated with equal probability at all times. More specifically, when a user first logs in, if the system initializes n to a random number between 1 and M, a user would have a likelihood of receiving a reward item of a category and/or rarity level equivalent to scenarios where a user had just received a reward item of a predefined category or rarity level, thereby beginning the player's experience in the worst possible statistical situation. By initializing from a linear approximation of the equilibrium distribution, instead of from a uniform distribution, the system chooses the random initial value of n such that there is a higher probability of starting n off at a smaller size. In this case, after a player has been playing for a while, the probability of n having different values follows approximately the linear distribution, illustrated as 402 in FIG. 4. Thus, it is better to initialize with the linear distribution, so that the initial player experience is not worse than a typical experience.

To make this point clearer, consider the case where only an item rarity is to be selected, regardless of the category. If we suppose there are just two rarities, common and rare, with common being the default, we let the max_counter value for the "rare" rarity be M, and let the associated counter be n. Whenever n drops to 0, the system grants the player a rare item, after which n is reset to a random number between 1 and M. The counter n then progresses back down towards 0. Therefore, on average, a player is farthest from obtaining a rare item just after they received one (and the counter resets). At other more general times, the player will be closer to getting their next rare item. By using the aforementioned approach, the system can avoid having the user begin at the worst possible position but rather, at a more common position.

The design and simulation tool of the present invention creates a game environment based on the above game rules and logic flows, and makes use of virtual players or agents to interact with the game environment. The simulation tool records game play data for all the agents and generates aggregate metrics for decision making. This helps a game developer to determine if game is running in accordance with the set rules and logic flows. The agent behavior and data also help a game developer to determine the level of user engagement with a game and they can use this judgment to improve the game experience for the players and optimize user engagement and retention.

Thus, for example, the counter value system for the exemplary game as described above allows for setting a maximum number of draws until a weapon (or any other item) is dropped. The game developer might decide, for instance, that a weapon drop, which is randomly generated subject to a boundary of occurring in at most 4 draws, would be ideal for a good user experience. In that case, there could be a 25% chance of a weapon dropping immediately after the previous weapon, a 25% chance of a weapon dropping two drops later, 25% chance of 3 drops later and 25% chance of 4 drops later. Using the simulation tool of the present specification, the game developer is able to test their judgment and see if the predefined boundary condition, e.g. 4, is a good number for the maximum number of draws between weapons, from the point of a good user experience. This can be done by setting the appropriate parameter to the boundary condition, e.g. 4, in the tool, and running a simulation with virtual players. After a simulated game session, the output aggregate metrics of the virtual players help the game developer to decide if their choice of "4" as the maximum number of draws had been too low, too high or optimum. If the decided option was not optimum, the game developer can change the option and test again. Thus, the simulation tool of the present specification allows a game to be iteratively optimized.

The following is a list of exemplary aggregate variables that may be subject to random generated, bounded by certain limitations, and other output variables generated by the tool, for the exemplary game described above. One of ordinary skill in the art would appreciate that the list is not exhaustive and there are many such variables. Further, the kind of variables generated may be customized according to the game being simulated. Exemplary variables for the above described game include:

- The average number of common or rare or premium items obtained, preferably but not necessarily, as a function of games played.
- The average amount of the first value type obtained from each acquisition channel, preferably but not necessarily, as a function of games played.
- The average number of items of each rarity which could be acquired, preferably but not necessarily, as a function of games played.
- The average number of reward packs of each type purchased, preferably but not necessarily, as a function of games played.
- The fraction of items of each type acquired by the player, preferably but not necessarily, as a function of games played.
- The average number of duplicate items received, preferably but not necessarily as a function of games played.

Figure 5:
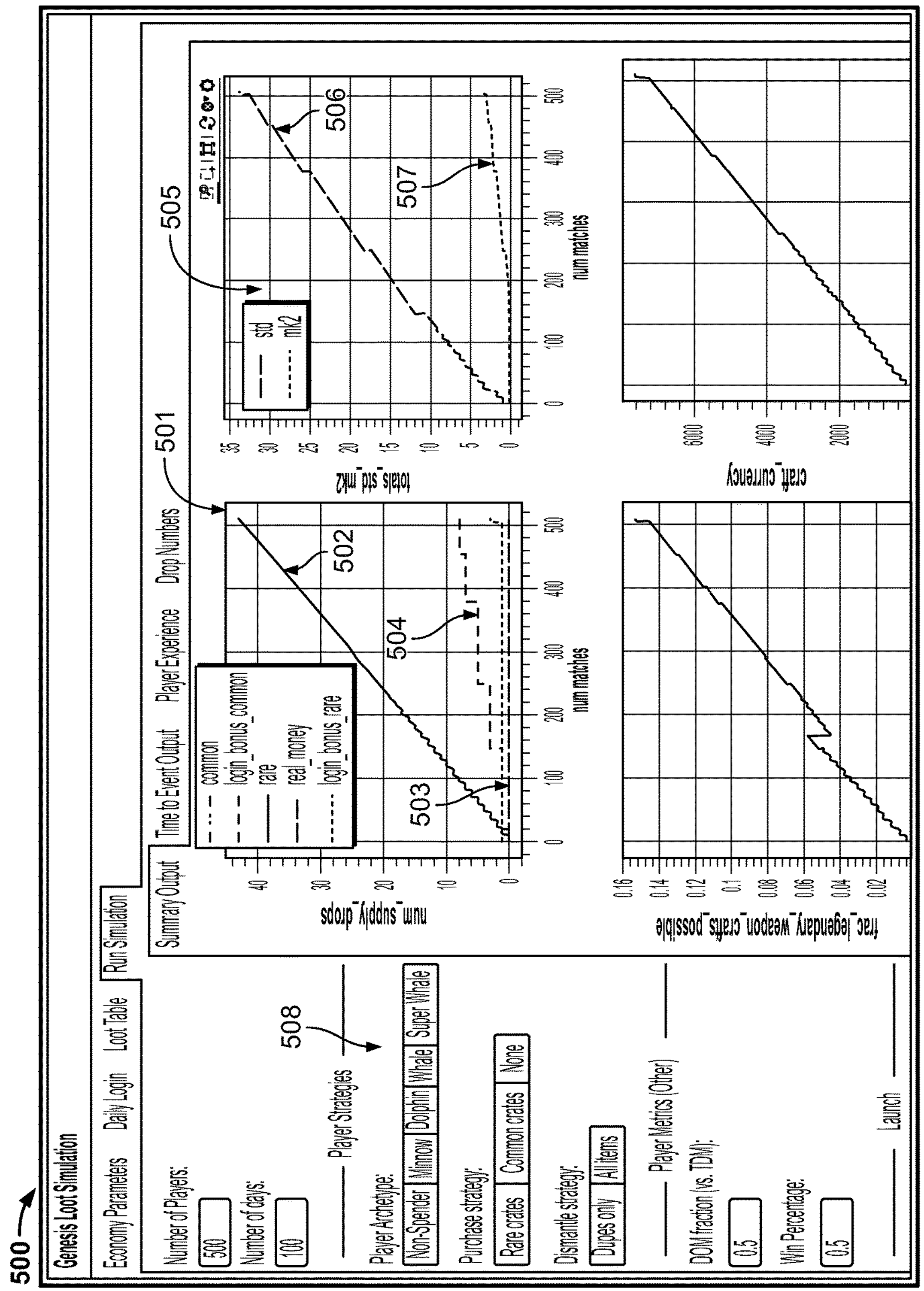
FIG. 5 illustrates an exemplary GUI screen presenting a number of metrics after a game simulation.

FIG. 5 illustrates an exemplary GUI screen presented to the game developer, when the simulation tool of the present specification is used for simulation and analysis of the exemplary game described above. Referring to FIG. 5, the GUI screen 500 presents several metrics in a graphical manner. For example, graph 501 illustrates various types of reward packs obtained by players on average as a function of the number of matches played, including rare 502, common 503 and login bonus 504 reward packs. Similarly, graph 505 shows the number of standard type of items obtained 506, as well as the number of premium items obtained 507, both as a function of the number of matches played. One of ordinary skill in the art would appreciate that any number and type of metrics may be recorded by the tool during game simulation and may be displayed in a graphical manner to the user. Another GUI output may include a histogram showing the game number when players obtained their first item of each category.

Screen 500 also provides information on player strategies or behavior 508, such as the amount of virtual currency or real money spent by players to purchase game reward items, the number of games played per day, whether a player purchases "common" or "rare" type of rewards, whether a player disposes of only duplicate items, or all items to gain other items or accumulate a value type, etc. In one embodiment, the simulation tool allows game developers to classify the simulated players into various groups, depending upon their playing strategy or behavior. One of ordinary skill in the art would appreciate that observations on player strategies and/or behavior provide valuable insights on what keeps the players engaged with the game.

Figure 6:
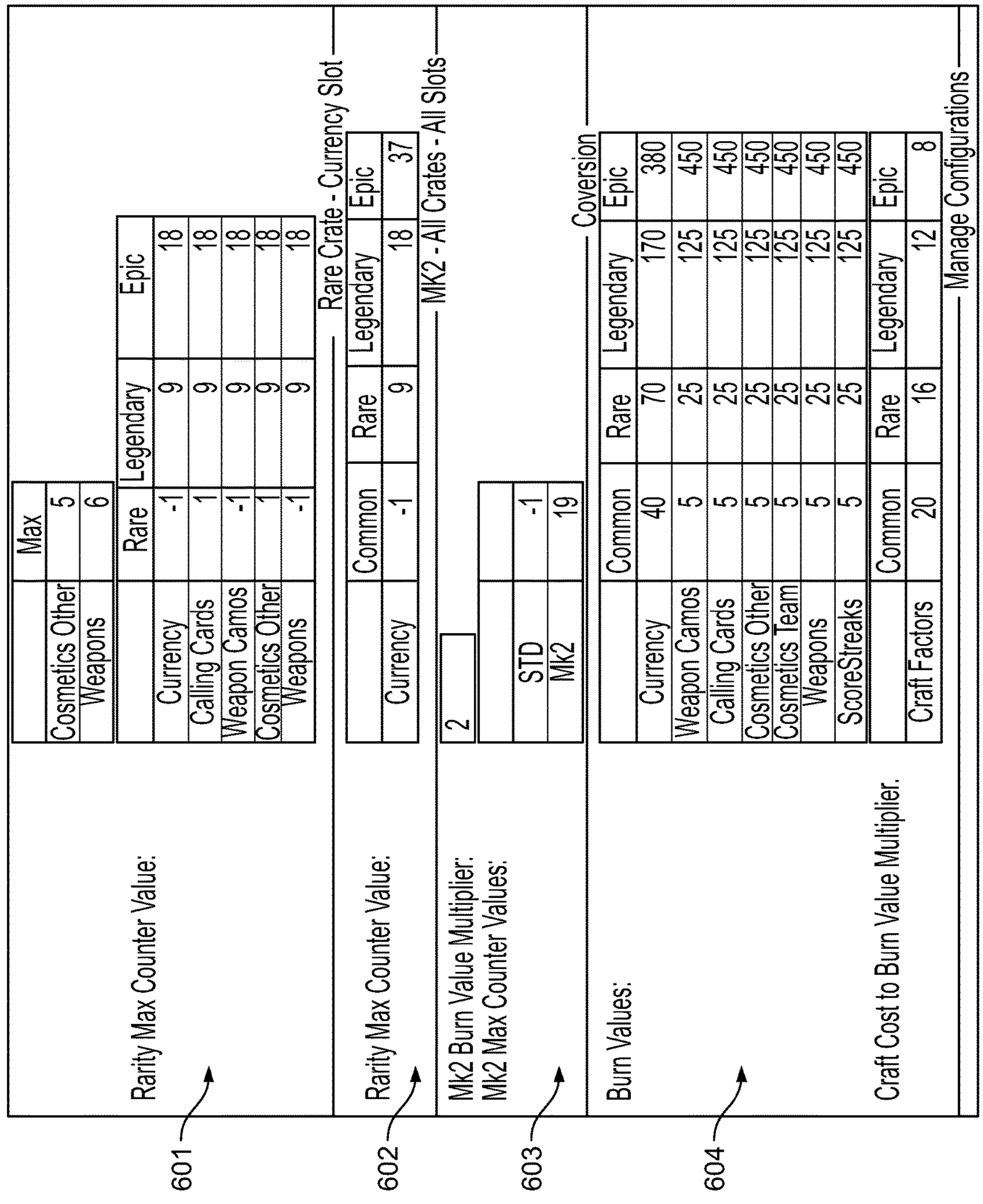
FIG. 6 depicts some exemplary parameters that may be defined before running a simulation using the simulation tool of the present specification.

FIG. 6 depicts some exemplary parameters that may be defined by a game developer before running a simulation using the simulation tool of the present specification. It may be appreciated that FIG. 6 illustrates only a small subset of the game parameters that may be defined for the purpose of simulation. Referring to FIG. 6, section 601 and 602 of the screen may be used to set counter values for rare and common items. The next two sections 603 and 604 may be used to determine the amount of a first, second or third value type obtained on disposing of items of a given category and/or rarity, and to determine the cost of acquiring an item of a given category and/or rarity.

Figure 7:
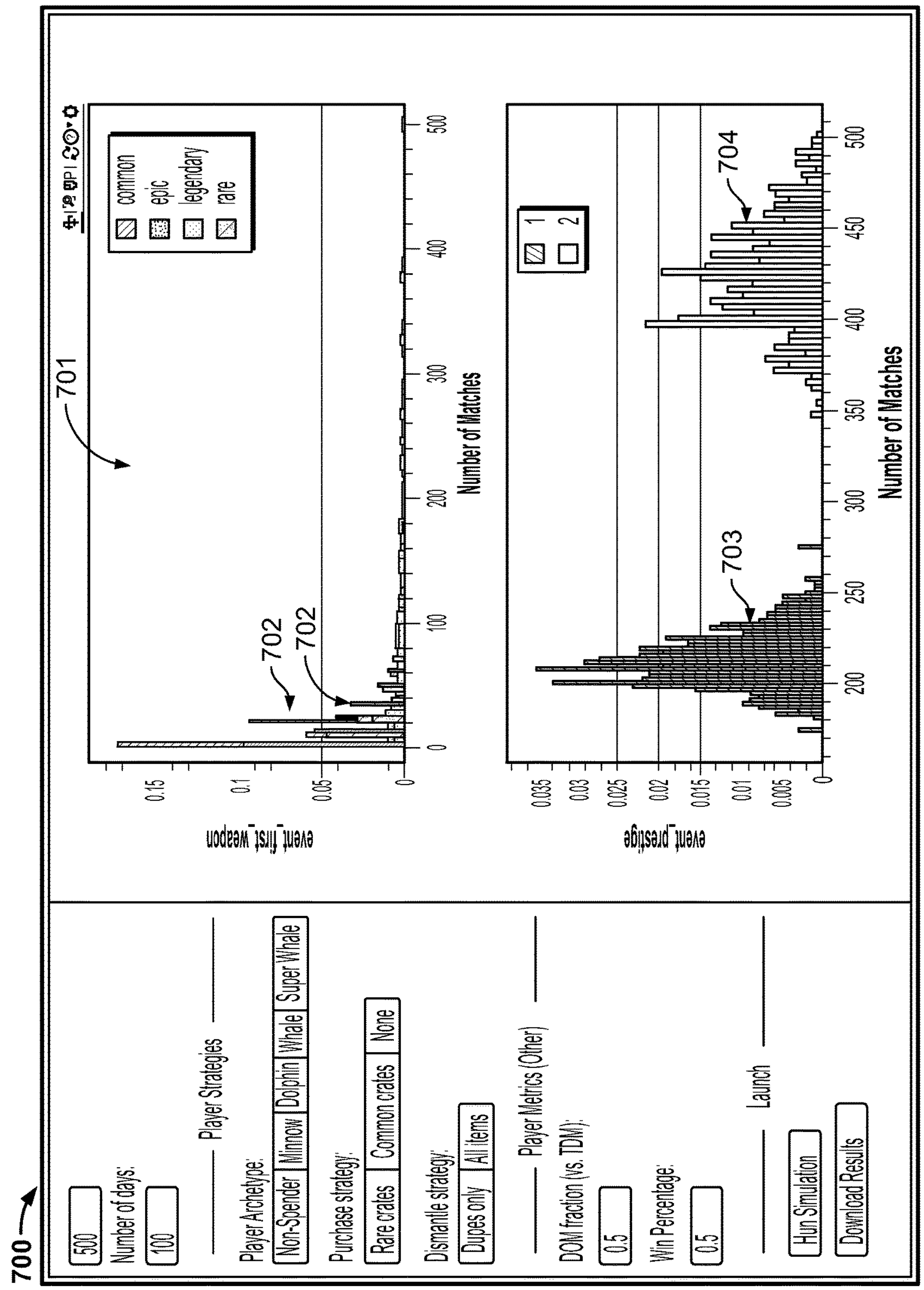
FIG. 7 illustrates another exemplary GUI screen that presents several metrics in a graphical manner.

FIG. 7 illustrates yet another exemplary GUI screen 700 that presents several metrics in a graphical manner. Referring to FIG. 7, a histogram 701 illustrates when players obtain their first reward, as a function of the number of matches played. Each bar 702 in the histogram shows the number of simulated players who obtained their first reward, such as a premium category weapon, at the given game number.

Graph 703 illustrates the number of matches played before a player achieves a certain level in the game. Similarly, graph 704 illustrates the number of matches played before a player achieves another specific level in the game.

Figure 8:
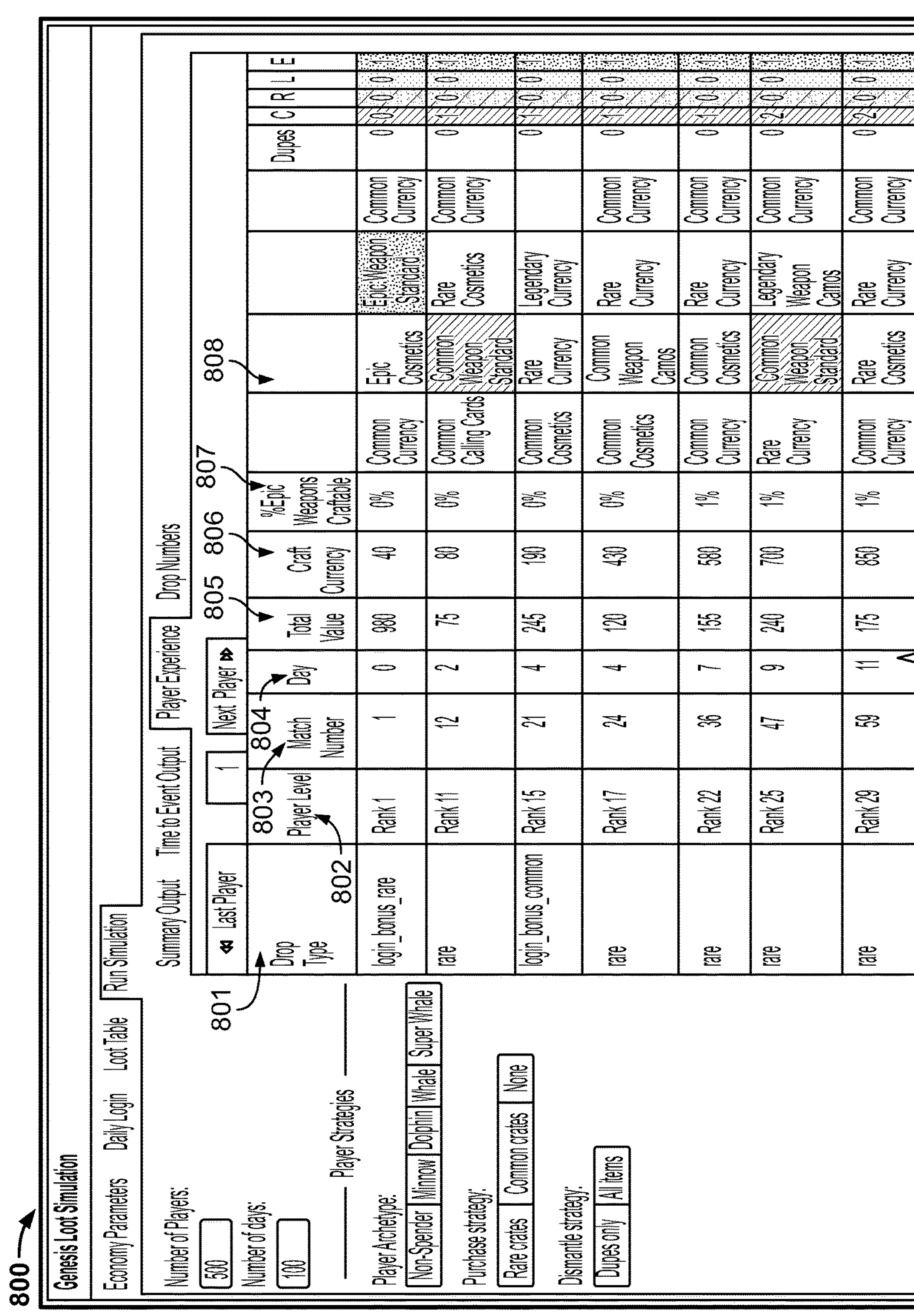
FIG. 8 is another GUI screen illustrating an exemplary output table, according to one embodiment of the present specification.
Figure 8:
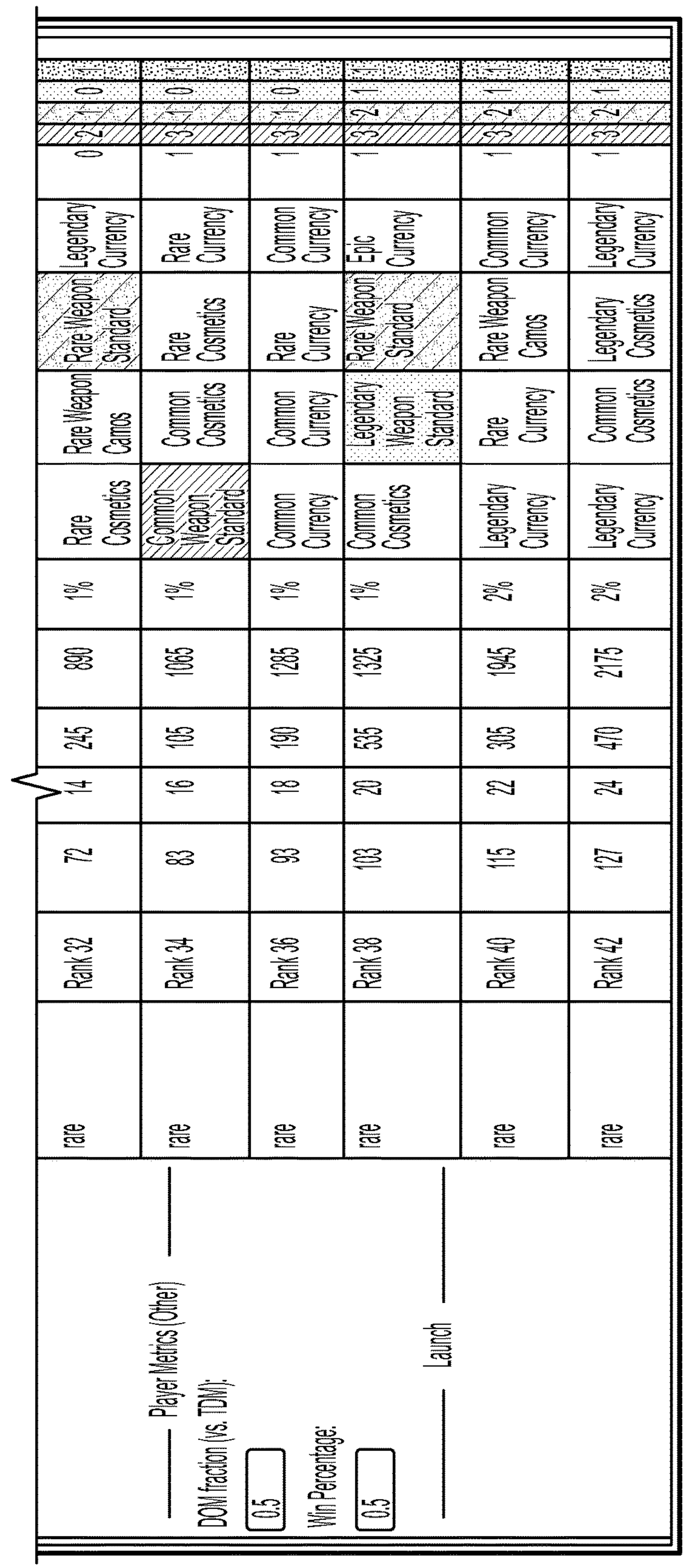

FIG. 8 is another GUI screen illustrating an exemplary output table comprising certain information for each player generated in the simulation exercise. Referring to FIG. 8, table 800 may be used to present information such as the type of rewards granted to a player 801, player level in the game 802, match number 803, day 804, total value of the rewards obtained in terms of game currency 805, the amount of a value type collected by the player 806, percentage of premium items a player could acquire if they spent all of their virtual game currency to do so 807, and specific categories of the items granted in a reward pack 808.

One of ordinary skill in the art would appreciate that any number and type of metrics recorded by the tool during game simulation may be displayed in a graphical and analytical manner to the user to assist game design and development.

Figure 9:
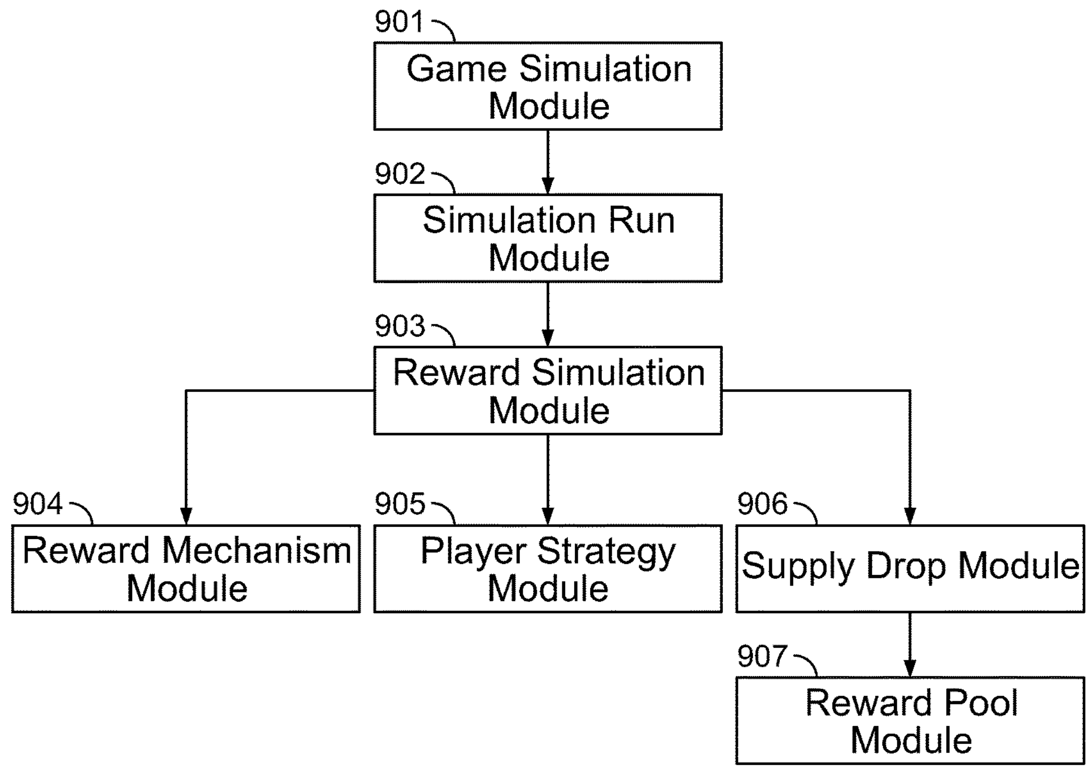
FIG. 9 illustrates exemplary software architecture for the simulation tool of the present specification, in accordance with one embodiment.

FIG. 9 illustrates an overall diagram of exemplary software architecture for the simulation tool of the present specification, which can be used for simulating a game environment and generating variables for reward acquisition and other aspects of a game, as described above. In one embodiment, the software architecture of the simulation tool comprises a number of software modules and sub-modules, each designed to carry out a specific set of functions. Referring to FIG. 9, various modules in the exemplary architecture include Game Simulation module 901, with a Simulation Run submodule 902; Reward Simulation module 903, with submodules for Reward Mechanism 904, Player Strategy 905 and Supply Drops 906; and a Reward Pool module 907.

In one embodiment, the Game Simulation module 901 performs the tasks for creating a framework for the simulation of game environment. Exemplary tasks performed by this module include creating an online user interface and populating it with default data and parameters which can be tuned by user. In one embodiment, these parameters include, but are not limited to counters for game items by type and rarity, the number of items available by type and rarity at specific days from game launch and player archetype parameters for defining playing and spending behavior of simulated players.

The Game Simulation module 901 also performs the basic tasks for running the simulation, such as initiating simulation run on user command, saving or restoring simulation settings, displaying key metric results in the user interface in graphical and/or textual form, and downloading inputs or results for the user in a desired format, such as a spreadsheet.

In one embodiment, the Game Simulation Module 901 is supported by a Simulation Run sub module 902, which collects parameters, data and counters from the user interface, which the user has defined or customized according to their preference. The sub module 902 executes the game simulation, and also generates statistics and creates charts and other graphical representations of the collected statistics.

The game simulation tool of the present specification further comprises a Reward Simulation Module 903, which obtains inputs from the Simulation Run sub module 902. Exemplary tasks performed by this module include creating a set of players for simulation, initializing inventory of items, initializing counters for reward generators, simulating matches for each player created and performing possible actions for the players, such as, but not limited to, collecting rewards, purchasing reward packs and crafting or dismantling items based on playing strategies. Reward Simulation module 903 also performs the tasks of logging match history for each simulated player and consolidating results across all players.

In one embodiment, when the Reward Simulation Module initializes counters for reward generators, it activates the reward generation logic in the Reward Mechanism sub module 904. The reward generation logic is used by the simulation tool to manage frequency, items and rarity for reward pack contents, and is based on user defined counters.

When simulating matches for players and performing actions for simulated players, such as purchasing, crafting or dismantling items based on playing strategies, the Reward Simulation Module 903 is supported by a Player strategy sub module 905, which executes the logic to enable simulated players to purchase supply drops or reward packs, create new weapons and dismantle items no longer required.

In one embodiment, the Reward Simulation Module 903 further interfaces with a Supply Drop sub module 906, which uses data from the Reward Simulation Module 903 and reward generation system to select contents of reward packs, based on current items in a simulated player's collection.

The Supply Drop sub module 906 interfaces with a Reward Pool module 907, in one embodiment. The Reward Pool module 907 uses input from the Supply Drop sub module 906 to manage lists of reward packs and tracks item availability at selected days from game simulation launch. The Reward Pool module, in one embodiment, further performs the task of randomly selecting a particular item to be included in a reward pack.

Figure 10A:
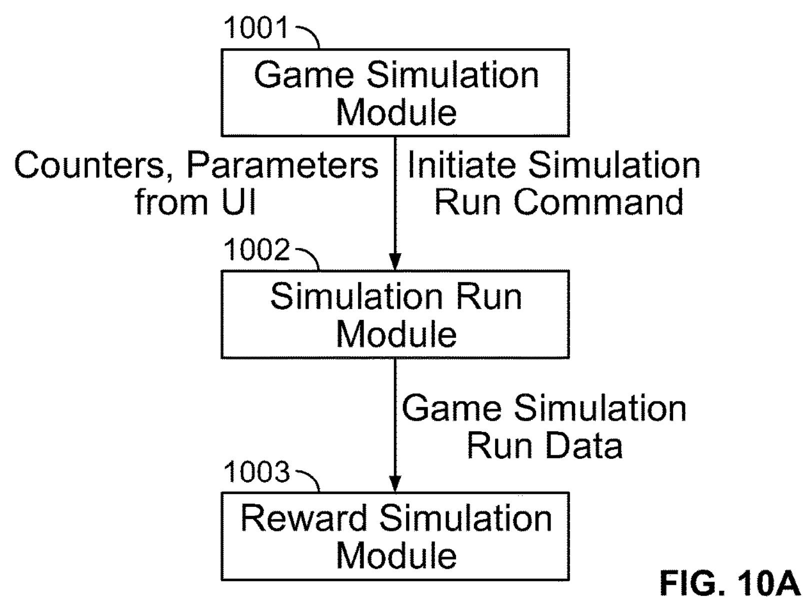
FIG. 10*a* illustrates the relationship between a subset of software modules shown in FIG. 9, according to one embodiment.
Figures 10B, 10C:
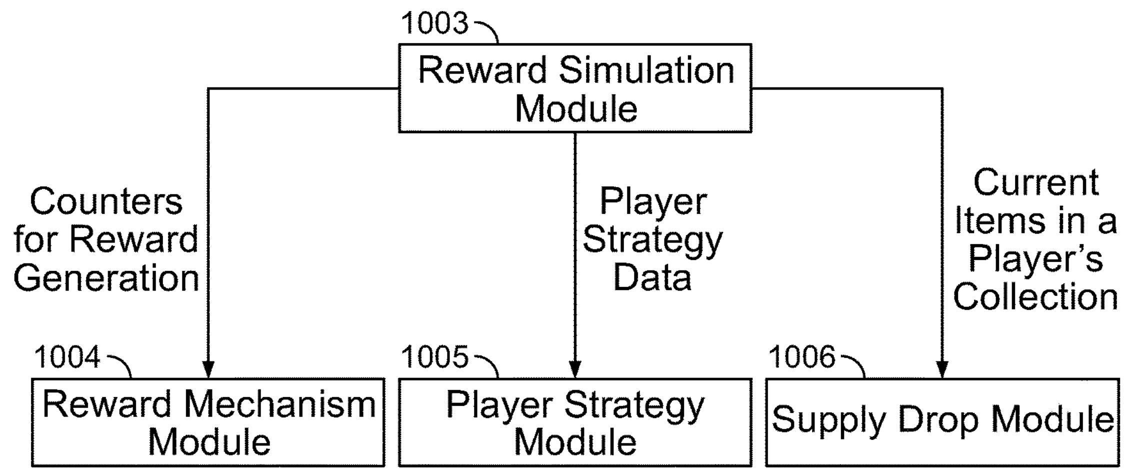
FIG. 10*b* illustrates the relationship between another subset of software modules shown in FIG. 9, according to one embodiment.
FIG. 10*c* illustrates the relationship between another subset of software modules shown in FIG. 9, in accordance with one embodiment of the present specification.

FIGS. 10*a*, 10*b* and 10*c* illustrate the relationship between individual software modules of FIG. 9. Referring to FIG. 10*a*, Game Simulation module 1001, as also explained above with reference to FIG. 9, creates online user interface and populates the interface with default data and parameters which can be tuned by user. These parameters include various counters for game items. In one embodiment, the Game Simulation module 1001 outputs counter and parameter data customized by the user, from the user interface to the Simulation Run sub module 1002. The Simulation Run submodule 1002 uses the counter and parameter data to run a game simulation, upon receiving an 'Initiate Simulation Run' command from the Game Simulation module 1001, and then to generate statistics for the simulation.

When the Simulation Run submodule 1002 runs a game simulation, it transmits simulation run data to the Reward Simulation module 1003, so that the latter may use the transmitted data to generate a set of players and to simulate matches for each player.

Referring to FIG. 10*b*, during a simulation run, the Reward Simulation module 1003 initializes counters for reward generators. This counter parameter data is supplied by the Reward Simulation module 1003 to the Reward Mechanism submodule 1004, which in one embodiment, executes reward generation logic to manage the frequency, item and rarity for reward pack contents based on counter parameter data, as described above.

As the Reward Simulation module 1003 simulates matches for each player, it also performs possible actions for the simulated player, which includes randomly determining or managing playing strategy for each player. As known to persons of ordinary skill in the art, playing strategies may include obtaining reward packs, accumulating or creating game items and/or discarding game items. In one embodiment, the Reward Simulation module 1003 provides strategy data for each player to the Player Strategy submodule 1005, which executes specific tasks for carrying out the strategy, such as for example, purchasing supply drops, crafting new weapons or dismantling game items.

As the Reward Simulation module 1003 manages playing strategy for each player, it also generates data regarding the game items and rewards acquired by each player. In one embodiment, data regarding each player's acquired items and rewards is output from the Reward Simulation module 1003 to the Supply Drop submodule 1006. The Supply Drop submodule uses data regarding existing items and rewards in a player's collection to determine the contents of reward packs generated further during the game simulation.

Referring to FIG. 10*c*, data delineating the contents of reward packs to be generated is output by the Supply Drop sub module 1006 to the Reward Pool module 1007. In one embodiment, based on the data from the Supply Drop submodule, the Reward Pool module 1007 further performs the task of randomly selecting a particular item to be included in a reward pack.

One of ordinary skill in the art would appreciate that the above described software architecture and its component modules are exemplary, and the number of modules and the tasks performed by each module may be designed in any manner suitable for optimally performing various functions associated with executing a game simulation by the tool of the present specification.

In the description and claims of the application, each of the words "comprise" "include" and "have", and forms thereof, are not necessarily limited to members in a list with which the words may be associated.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A computer-implemented method for awarding virtual game items to a plurality of virtual players in a multi-player video game, said method being implemented in a computer having a processor and a random access memory, wherein said processor is in data communication with a display and with a storage unit, the method comprising:

generating a graphical user interface through which a user may input a plurality of parameters governing an execution of the multi-player video game, wherein the plurality of parameters includes a number of the plurality of virtual players and a type of one or more of the plurality of virtual players;

forming a pool of virtual game items in the computer, wherein the virtual game items comprise at least one of weapons, tools, cosmetic consumables, calling cards, emblems, or gear and wherein each of said virtual game items belongs to a category;

executing the multi-player video game with the plurality of virtual players based on the plurality of parameters and using the virtual game items;

establishing, in the computer, a lower boundary condition and an upper boundary condition for each category of said virtual game items;

for each of said plurality of virtual players and during the multi-player video game session, randomly selecting a value between said lower boundary condition and upper boundary condition for a given category of said virtual game items and associating said value to said category of said virtual game items;

for each of said plurality of virtual players and during the multi-player video game session, modifying each of the selected values associated with each category of said virtual game items to yield, for each category, a modified value associated with each category of said virtual game items;

for each of said plurality of virtual players and during the multi-player video game session, determining, for each category, if the modified value meets the lower boundary condition or the upper boundary condition;

for each of said plurality of virtual players and during the multi-player video game session, if the modified value meets the lower boundary condition or the upper boundary condition for one category, awarding a virtual game item from said one category; and for each of said plurality of virtual players and during the multi-player video game session, if, for any of the categories, none of the modified values meet the lower boundary condition or upper boundary condition, allocating an alternative award.

2. The computer-implemented method of claim 1 wherein the multi-player video game session is a simulated multi-player video game session, said simulated multi-player video game session using historical player data to determine actions of each of said plurality of virtual players.

3. The computer-implemented method of claim 2 further comprising generating a graphical user interface output of said simulated multi-player video game session, said graphical user interface output comprising at least one of 1) a plot representing an average number of categories of items purchased or awarded as a function of a game number, 2) a histogram showing a distribution of when an average of said plurality of virtual players obtained a first game item in the simulated multi-player video game session, 3) data representative of an accumulation of virtual game currency, 4) data representative of an acquisition of a number of each type of virtual game item, 5) data representative of a degree of rarity or commonness of virtual game items obtained, 6) data representative of a number of reward packs obtained by said plurality of virtual players as a function of a number of simulated multi-player video game sessions played, or 7) data representative of a rarity or commonness of a number of reward packs obtained by said plurality of virtual players as a function of a number of simulated multi-player video game sessions played.

4. The computer-implemented method of claim 3 further establishing modifying at least one of the lower boundary condition and the upper boundary condition for at least one category of said virtual game items based upon said graphical user interface output of said simulated multi-player video game session.

5. The computer-implemented method of claim 1 wherein said pool of virtual game items is formed based upon at least one of three value types.

6. The computer-implemented method of claim 5 wherein a first of said three value types is a value received by a virtual player based upon a function of how long said virtual player played a multi-player video game or a function of whether said virtual player won or lost the multi-player video game.

7. The computer-implemented method of claim 5 wherein a second of said three value types is a value received by a virtual player for completing a mission, a challenge, or other discrete objective or goal in a game.

8. The computer-implemented method of claim 5 wherein a third of said three value types is a value randomly received by a virtual player.

9. The computer-implemented method of claim 5 wherein a third of said three value types is a value purchased by a virtual player.

10. The computer-implemented method of claim 1 further comprising, for each of said plurality of virtual players, if, for more than one category, more than one of the values meets or is greater than the lower boundary condition, awarding a virtual game item from a category associated with one value of said more than one of the values that is most greater than its lower boundary condition.

11. The computer-implemented method of claim 1 further comprising, for each of said plurality of virtual players and during the multi-player video game session, after awarding a virtual game item from said one category, randomly selecting a new value between said lower boundary condition and upper boundary condition for said one category of said virtual game items and associating said new value to said one category of said virtual game items.

12. The computer-implemented method of claim 1 wherein said modifying each value is performed by decrementing said value by a predefined amount and wherein determining, for each category, if the modified value meets the lower boundary condition is performed by determining if the decremented value meets or is greater than the lower boundary condition.

13. The computer-implemented method of claim 1 wherein said modifying each value is performed by incrementing said value by a predefined amount and wherein determining, for each category, if the modified value meets the upper boundary condition is performed by determining if the incremented value meets or is greater than the upper boundary condition.

14. The computer-implemented method of claim 1 wherein the alternative award is virtual currency.

* * * * *